(12) United States Patent
Watanabe

(10) Patent No.: US 10,205,716 B2
(45) Date of Patent: Feb. 12, 2019

(54) SYSTEM, APPARATUS, AND METHOD FOR AUTHENTICATED REQUEST TO BE PLACED IN A CHANGED FOLDER STRUCTURE

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 15/264,727

(22) Filed: Sep. 14, 2016

(65) Prior Publication Data
US 2017/0093837 A1  Mar. 30, 2017

(30) Foreign Application Priority Data

Sep. 28, 2015  (JP) ................. 2015-189829

(51) Int. Cl.
*G06F 21/44* (2013.01)
*H04L 29/06* (2006.01)
*H04L 29/08* (2006.01)
*G06F 17/30* (2006.01)
*H04L 9/32* (2006.01)

(52) U.S. Cl.
CPC ........ *H04L 63/08* (2013.01); *G06F 17/30165* (2013.01); *G06F 17/30893* (2013.01); *H04L 67/06* (2013.01); *H04L 67/1097* (2013.01); *H04L 63/083* (2013.01); *H04L 63/12* (2013.01); *H04L 67/02* (2013.01)

(58) Field of Classification Search
None
See application file for complete search history.

(56) References Cited

U.S. PATENT DOCUMENTS

| 7,318,060 B2 | 1/2008 | Yamamoto |
| 9,219,845 B2 | 12/2015 | Watanabe et al. |
| 9,300,630 B2 | 3/2016 | Watanabe |

(Continued)

FOREIGN PATENT DOCUMENTS

JP  2004-252953  9/2004

*Primary Examiner* — Venkat Perungavoor
(74) *Attorney, Agent, or Firm* — IPUSA, PLLC

(57) ABSTRACT

An information processing system includes a terminal apparatus and an information processing apparatus that is connected to the terminal apparatus via a network. The terminal apparatus includes a storage unit configured to store a first application program configured to provide another application program executed in the terminal apparatus with an interface for transmitting request information to the information processing apparatus, wherein the first application program includes authentication information for using the information processing apparatus, and a second application program configured to transmit the request information including identification information of an application program to the information processing apparatus in response to a predetermined user's operation, wherein the identification information of the application program is recorded in the second application program. The information processing apparatus includes an authentication unit configured to authenticate the request information transmitted from the terminal apparatus, and an information provision unit configured to change folder structure information.

8 Claims, 20 Drawing Sheets

(56) References Cited

U.S. PATENT DOCUMENTS

| | | |
|---|---|---|
| 9,390,247 B2 | 7/2016 | Watanabe et al. |
| 2005/0256882 A1* | 11/2005 | Able ................. G06F 17/30861 |
| 2008/0147825 A1* | 6/2008 | Tanimoto .............. H04L 67/104 |
| | | 709/218 |
| 2015/0339017 A1 | 11/2015 | Watanabe |
| 2016/0112422 A1 | 4/2016 | Watanabe |

* cited by examiner

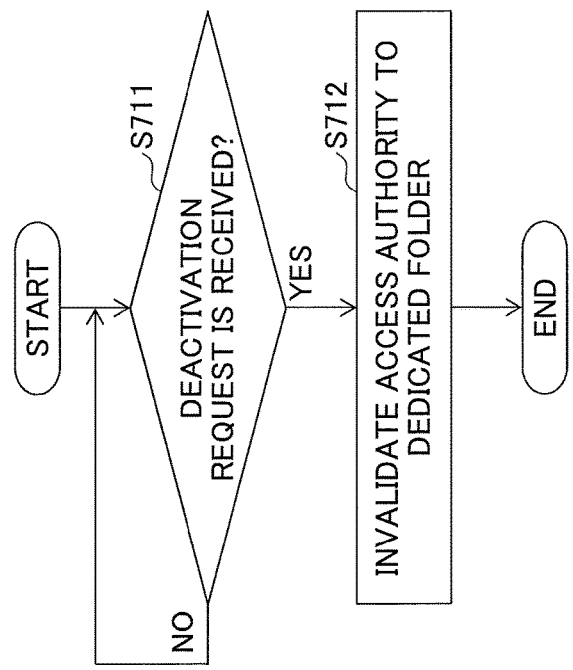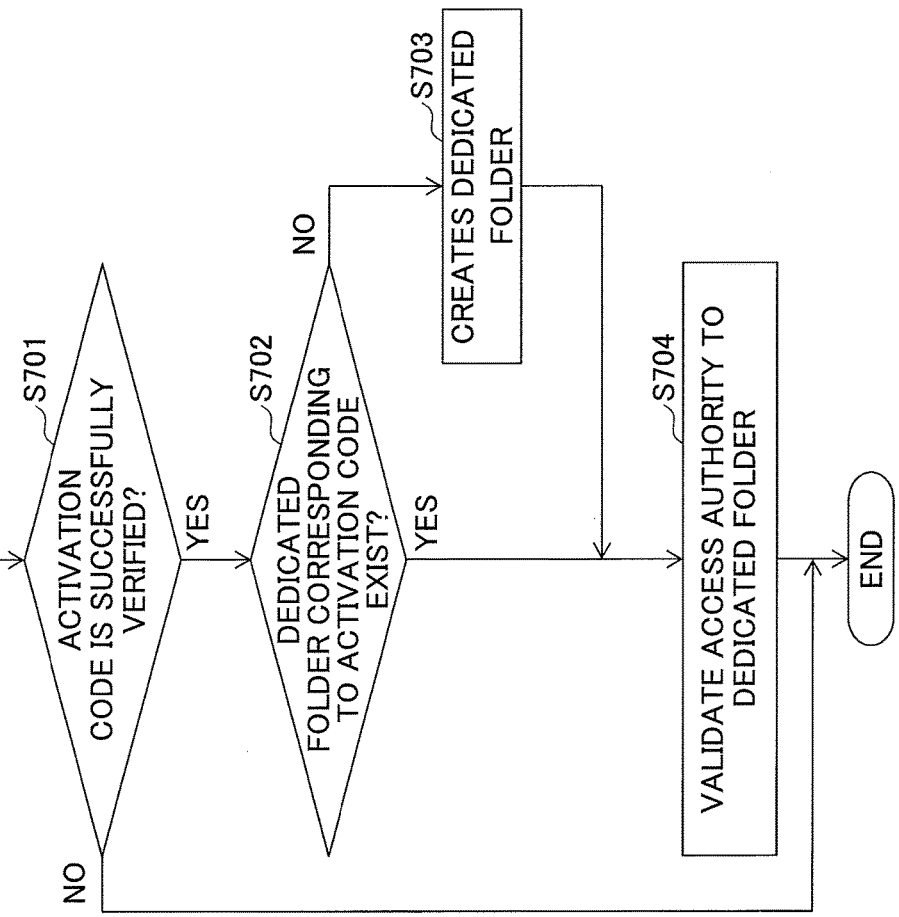

FIG.8A

| APPLICATION PROGRAM | APP ID | APP PASSWORD | ACTIVATION CODE | PATH INFORMATION TO DEDICATED FOLDER | STATE |
|---|---|---|---|---|---|
| EXTERNAL APPLICATION PROGRAM A | AAAAA | aaaaa | xxxxx-xxxxx-xxxxx-xxxxx | ¥SHARED¥DEDICATED FOLDER1 | VALID |
| EXTERNAL APPLICATION PROGRAM B | BBBBB | bbbbb | yyyyy-yyyyy-yyyyy-yyyyy | ¥SHARED¥DEDICATED FOLDER2 | INVALID |
| EXTERNAL APPLICATION PROGRAM C | CCCCC | ccccc | zzzzz-zzzzz-zzzzz-zzzzz | ¥SHARED¥DEDICATED FOLDER3 | VALID |
| ... | ... | ... | ... | ... | ... |

FIG.8B

| APP ID | APP PASSWORD | PATH INFORMATION TO DEDICATED FOLDER |
|---|---|---|
| AAAAA | aaaaa | ¥SHARED¥DEDICATED FOLDER1 |

FIG.8C

| DEVICE ID | USER ID | USER PASSWORD |
|---|---|---|
| aaa-bbb-ccc | User01 | Password01 |
| aaa-bbb-ddd | User02 | Password02 |
| ... | ... | ... |

FIG.8D

| ITEM | INFORMATION |
|---|---|
| RELAY SERVER HOST | test-server |
| FILE SERVER ID | 123456789 |
| IP ADDRESS | 11.22.33.44 |
| USER ID | user |
| USER PASSWORD | pass |
| DEVICE ID | aaa-bbb-ccc |

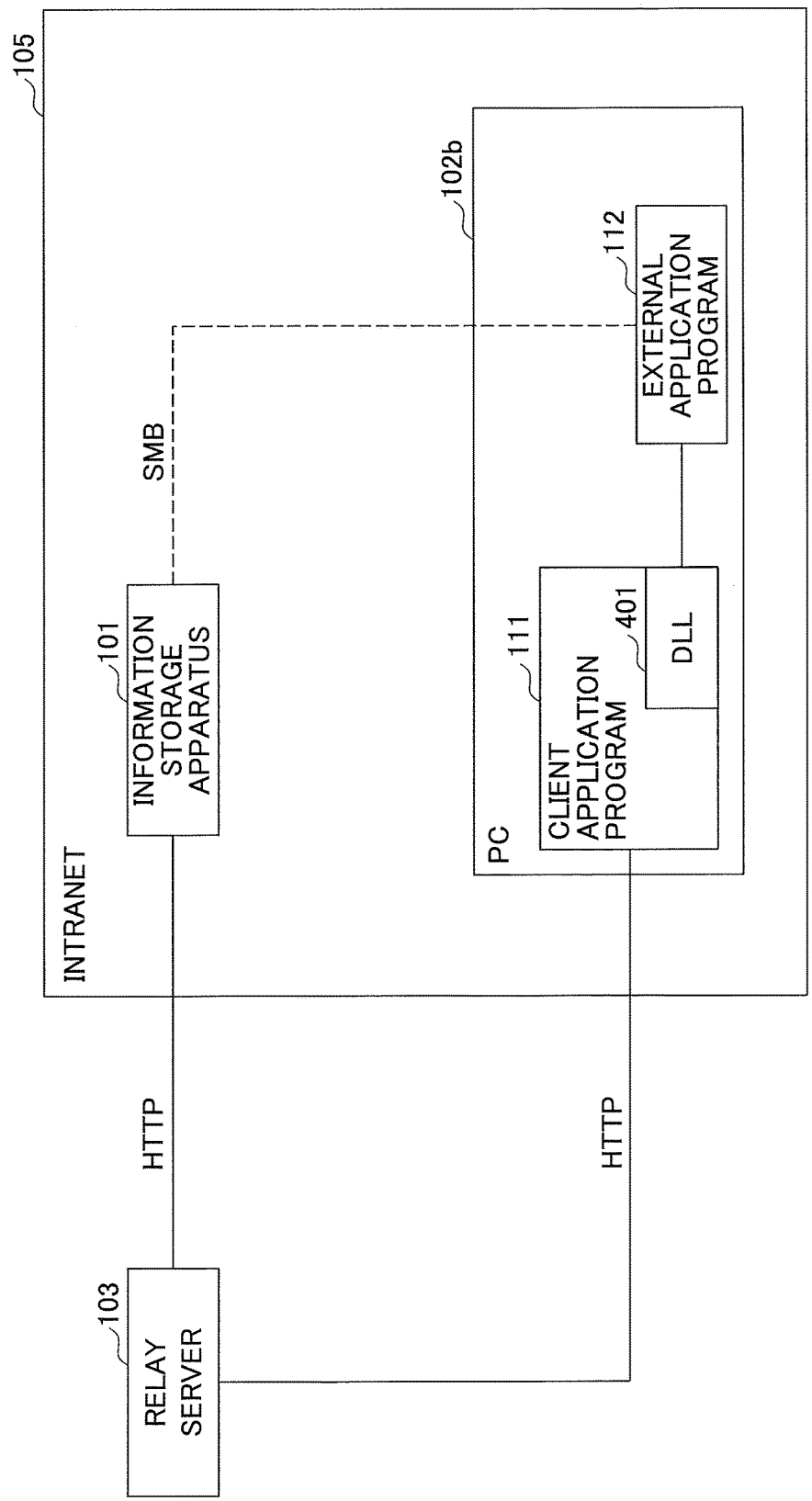

FIG.13A

```
FUNCTION LIST      ~1310
┌─────────────┐
│ FOLDER LIST │ ~1311
├─────────────┤
│    BIND     │ ~1312
├─────────────┤
│     ...     │
└─────────────┘
```

FIG.13B

```
FOLDER LIST                    ~1320
┌──────────────┬────────┐
│ SHARED FOLDER│  FILE  │ ~1321
│              ├────────┤
│              │ SEARCH │
│              ├────────┤
│              │WORKFLOW│
├──────────────┼────────┤
│PRIVATE FOLDER│  FILE  │ ~1322
│              ├────────┤
│              │ SEARCH │
│              ├────────┤
│              │WORKFLOW│
├──────────────┴────────┤
│ BIND                  │
├───────────────────────┤
│ ...                   │
└───────────────────────┘
```

FIG.13C

```
                              ~1330
┌──────────────┬─────────────────┐
│ SHARED FOLDER│                 │ ~1331
├──────────────┤                 │
│DEDICATED     │  BIND1          │ ~1332
│FOLDER        ├─────────────────┤
│              │  BIND2          │
├──────────────┴─────────────────┤
│ BIND                           │
├────────────────────────────────┤
│ ...                            │
└────────────────────────────────┘
FOLDER LIST
```

FIG.14A

| APPLICATION PROGRAM | APP IDENTIFICATION INFORMATION | ACTIVATION CODE | PATH INFORMATION TO DEDICATED FOLDER | STATE |
|---|---|---|---|---|
| EXTERNAL APPLICATION PROGRAM A | aaaaa-aaaaa-aaaaa | xxxxx-xxxxx-xxxxx-xxxxx | ¥SHARED¥DEDICATED FOLDER1 | VALID |
| EXTERNAL APPLICATION PROGRAM B | bbbbb-bbbbb-bbbbb | yyyyy-yyyyy-yyyyy-yyyyy | ¥SHARED¥DEDICATED FOLDER2 | INVALID |
| EXTERNAL APPLICATION PROGRAM C | ccccc-ccccc-ccccc | zzzzz-zzzzz-zzzzz-zzzzz | ¥SHARED¥DEDICATED FOLDER3 | VALID |
| ... | | | ... | |

FIG.14B

| APP IDENTIFICATION INFORMATION | PATH INFORMATION TO DEDICATED FOLDER |
|---|---|
| aaaaa-aaaaa-aaaaa | ¥SHARED¥DEDICATED FOLDER1 |

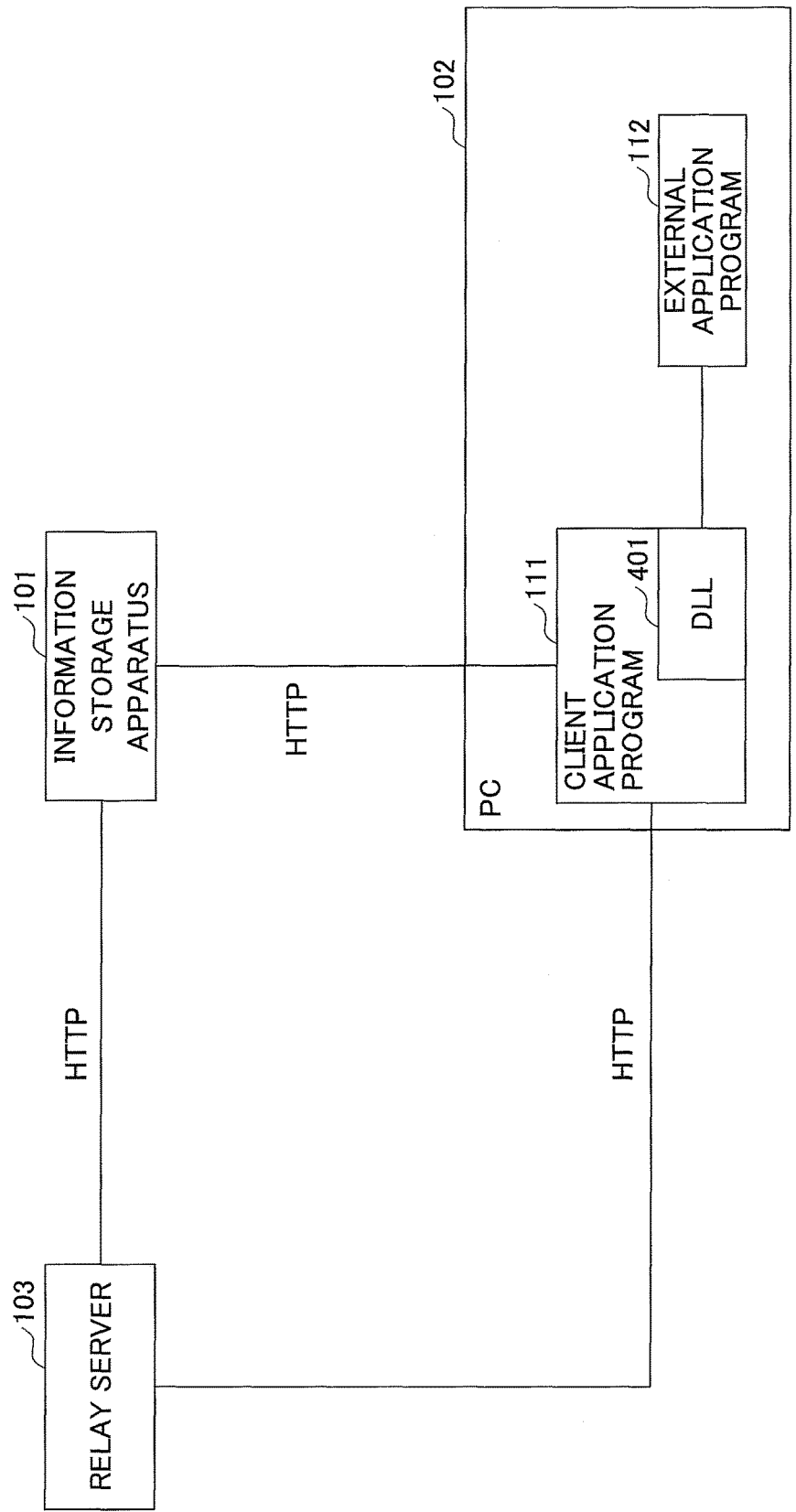

```
{
"CID": "123456789",
"Authorization": "USER ID:USER PASSWORD",
"deviceID": "aaa-bbb-ccc",
"accessType": "1",
}
```

```
{
"CID": "123456789",
"Authorization": "USER ID:USER PASSWORD",
"deviceID": "aaa-bbb-ccc",
"accessType": "1",
"applicationID": "aaaaa-aaaaaa-aaaaa"
}
```

FIG.18C

| AccessType | REQUEST SOURCE |
|---|---|
| 0 | CLIENT APPLICATION PROGRAM |
| 1 | EXTERNAL APPLICATION PROGRAM |

SYSTEM, APPARATUS, AND METHOD FOR AUTHENTICATED REQUEST TO BE PLACED IN A CHANGED FOLDER STRUCTURE

CROSS-REFERENCE TO RELATED APPLICATION

The present application claims priority under 35 U.S.C. § 119 to Japanese Patent Application No. 2015-189829 filed on Sep. 28, 2015. The contents of which are incorporated herein by reference in their entirety.

BACKGROUND OF THE INVENTION

1. Field of the Invention

The present disclosure relates to information processing systems, information processing apparatuses, and methods.

2. Description of the Related Art

A technology is known, in which information stored in a storage server apparatus connected to a network is used by a terminal apparatus.

Also, Japanese Unexamined Patent Application Publication No. 2004-252953 (Patent Document 1) describes a document management apparatus that authorizes a usage of a document storage when a usage request of the document storage is received from a client apparatus and usage authorization information included in the usage request coincides with the usage authorization information having transmitted to a client apparatus in advance.

There is a need for storing files dedicated for a specific application program in the above described storage server apparatus. However, the files dedicated for the specific application program cannot be appropriately used when it is retrieved by an application program other than the specific application program. Furthermore, the files dedicated for the specific application program may cause unexpected failure, etc., in the application program other than the specific application program. Therefore, preferably, information related to the files dedicated for the specific application program is provided to the terminal apparatus only when a request through the specific application program is received.

RELATED ART DOCUMENT

Patent Document

[Patent Document 1]: Japanese Unexamined Patent Application Publication No. 2004-252953

SUMMARY OF THE INVENTION

An object of the present disclosure is to provide an information processing system with which folder structure that is provided to a terminal apparatus can be easily changed according to application program, which requests information, executed in the terminal apparatus.

The following configuration is adopted to achieve the aforementioned object.

In one aspect of the embodiment of the present disclosure, there is provided an information processing system including a terminal apparatus and an information processing apparatus that is connected to the terminal apparatus via a network. The terminal apparatus includes a storage unit configured to store a first application program configured to provide another application program that is executed in the terminal apparatus with an interface for transmitting request information to the information processing apparatus, wherein the first application program includes authentication information for using the information processing apparatus, and a second application program configured to transmit the request information including identification information of an application program to the information processing apparatus in response to a predetermined user's operation, wherein the identification information of the application program is recorded in the second application program. The information processing apparatus including an authentication unit configured to authenticate the request information transmitted from the terminal apparatus and an information provision unit configured to change folder structure information in response to detecting that the request information is successfully authenticated and the identification information of the application program is included in the request information, wherein a folder list is displayed in the terminal apparatus in accordance with the folder structure information.

Other objects, features and advantages of the present disclosure will become apparent from the following detailed description when read in conjunction with the accompanying drawings.

BRIEF DESCRIPTION OF THE DRAWINGS

FIG. 7A is a flowchart illustrating an example activation process.

FIG. 7B is a flowchart illustrating an example deactivation process.

FIG. 8A is a diagram illustrating an example app information.

FIG. 8B is a diagram illustrating app information registered (recorded) in an external application program.

FIG. 8C is a diagram illustrating example user information.

FIG. 8D is a diagram illustrating example usage information.

FIG. 9 is a diagram illustrating an example configuration of the information processing system of a first embodiment.

FIG. 13A is an example display screen of the PC.

FIG. 13B is another display screen of the PC.

FIG. 13C is still another display screen of the PC.

FIG. 14A is a diagram illustrating example app information managed by the information storage apparatus.

FIG. 14B is an example app information registered in an external application program.

FIG. 15 is a diagram illustrating an example configuration of the information processing system of a second embodiment.

FIG. 18A is a diagram illustrating an example access information item.

FIG. 18B is a diagram illustrating another example access information item.

FIG. 18C is a diagram for illustrating information related to the example access information item.

DETAILED DESCRIPTION OF THE PREFERRED EMBODIMENTS

In the following, embodiments of present disclosure will be described with reference to accompanying drawings.

<System Configuration>

In the following, a system configuration of an information processing system of an embodiment of the present disclosure will be described.

Figure 1:
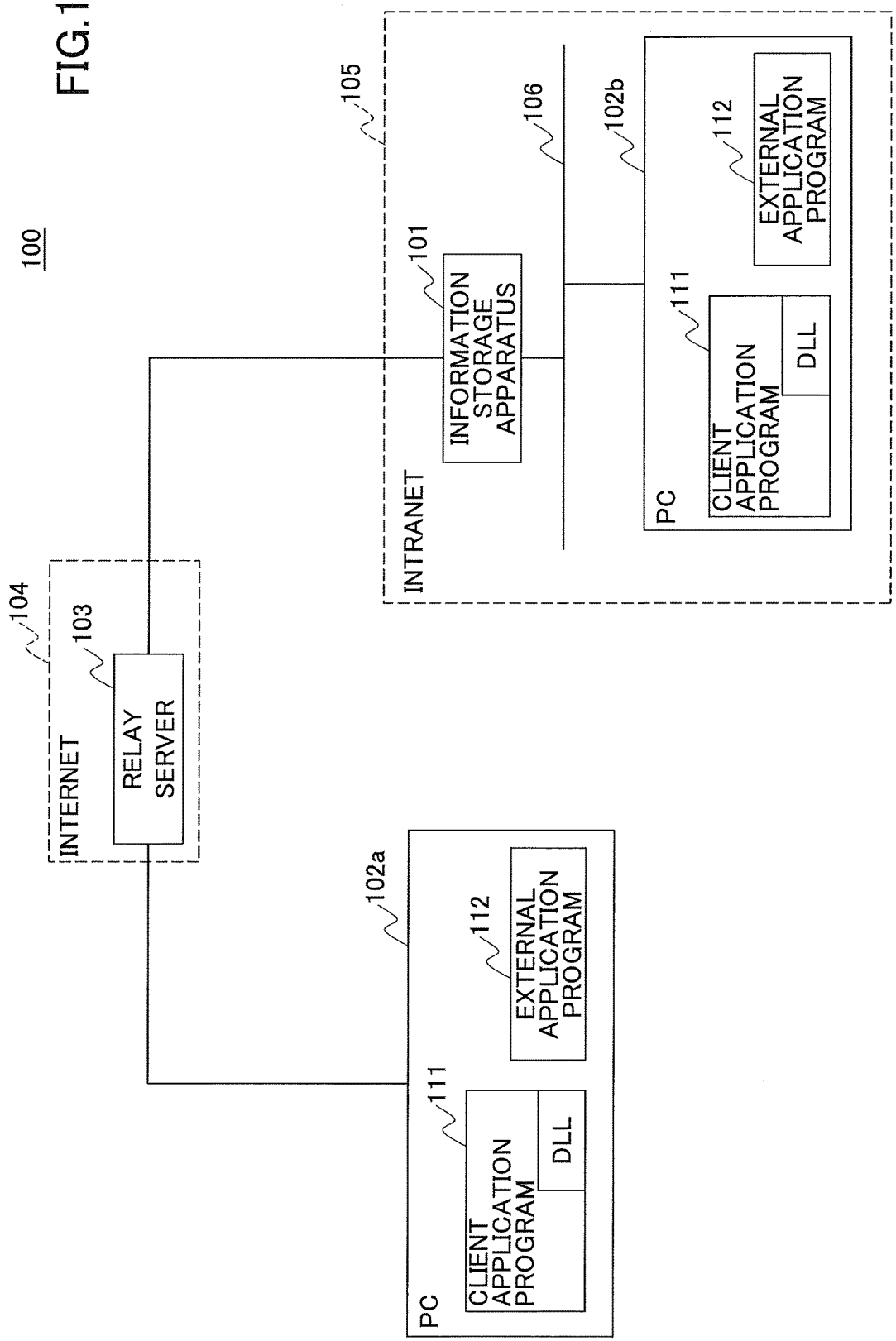
FIG. 1 is a diagram illustrating an example configuration of the information processing system of a present embodiment of the present disclosure.

FIG. 1 is a diagram illustrating an example configuration of the information processing system of the present embodiment. The information processing system 100 includes an information storage apparatus 101, PCs (Personal Computer) 102a and 102b, a relay server 103, and the like.

For example, the information storage apparatus 101 is an information processing apparatus disposed in and connected to an intranet 105 that is protected by a firewall, and the like. The information storage apparatus 101 performs processes as a file server, processes for acquiring a request message, etc., from the relay server 103 to the information storage apparatus 101, and the like. Additionally, the information storage apparatus 10 may be formed as a distributed system including a plurality of computers.

In the example illustrated in FIG. 1, the information storage apparatus 101 is connected to the PC 102b via a network 106 such as a LAN (Local Area Network) included in the intranet 105. Also, the information storage apparatus 101 is connected to the internet 104 so as to communicate with the relay server 103.

For example, PCs (terminal apparatuses) 102a and 102b are information processing apparatuses such as notebook PCs used by users. Additionally, in the following, an arbitrary PC among the PCs 102a and 102b is referred to as a PC 102. The PC 102 includes a communication interface for connecting to the internet 104, to the network 106 included in the intranet 105, and the like. Also, application programs including a client application program 111 and an external application program 112 (hereinafter referred to as "app") are installed in the PC 102.

For example, the client application program 111 is an app used for accessing a file installed in the information storage apparatus 101, etc., from the PC 102. The user can use a file, etc., stored in the information storage apparatus 101 from outside of the intranet 105 via the 103 by using the client application program 111.

For example, the external application program 112 is an app other than the client application program 111, such as an app for creating a document, for creating a spreadsheet, and the like.

The relay server 103 is an information processing apparatus connected to the internet 104, and relays data transmitted between the PC 102a, etc., connected to a network outside the intranet 105 and the information storage apparatus 101 connected to a network inside the intranet 105.

For example, in the information processing system 100, the user can use a file stored in the information storage apparatus 101 by using file sharing function provided by an OS (Operating System) of the PC 102 so as to connect to the information storage apparatus 101 in a case where the PC 102 is connected to a network inside the intranet 105. On the other hand, in a case where the PC 102 is connected to a network outside the intranet 105, the PC 102 cannot access to the information storage apparatus 101 due to the firewall. Therefore, the user use the client application program 111 executed in the PC 102 disposed outside the intranet 105 and connected to the internet 104 so as to use the file, etc., stored in the information storage apparatus 101 through the relay server 103.

Also, the client application program 111 of the present embodiment provides an interface for accessing the information storage apparatus 101 from a program such as external application program 112 executed in the PC 102. Preferably, the interface is provided as a library, etc., which can be commonly used by a plurality of programs such as DLL (Dynamic Link Library) of WINDOWS.

The user can use the file, etc., stored in the information storage apparatus 101 through the external application program 112 via the relay server 103 by using the interface provided by the client application program 111.

Additionally, the interface provided by the client application program 111 can be used by the PC 102b connected to a network inside the intranet 105. For example, the user of the PC 102b can use functions provided by the information storage apparatus 101 through operations in the PC 102b similar to operations in PC 102a even when the PC 102b is connected to the network 106 inside the intranet 105, where the PC 102b connected to a network inside the intranet 105.

In the configuration described above, the information storage apparatus 101 has a function for providing a dedicated folder for storing a file dedicated for a specific application (e.g., external application program 112) executable in the PC 102.

For example, the PC 102 transmits request information including identification information of the external application program 112 to the information storage apparatus 101 in accordance with a predetermined operation input to the external application program 112, where the external application program 112 has been activated through a certain activation operation. On the other hand, for example, the PC 102 transmits request information without the identification information of the external application program 112 to the information storage apparatus 101 in accordance with an operation (e.g., request of file list) common to a plurality of apps.

Also, the information storage apparatus 101 provides the PC 102 with a folder list including the folder dedicated for the external application program 112 in a case where valid identification information of the external application program 112 is included in the request information received from the PC 102. On the other hand, the information storage apparatus 101 provides a default folder list in which the folder dedicated for the external application program 112 is not included in a case where valid identification information of the external application program 112 is not included in the request information received from the PC 102.

As described above, according to the present embodiment, the information processing system 100 can be achieved, in which folder structure that is provided to a terminal apparatus can be easily changed according to application program, which requests information, executed in the terminal apparatus. Additionally, for example, the folder structure refers to specification, information, etc., which defines a display manner of a folder list displayed in the PC.

<Hardware Configuration>

In the following, hardware configurations of respective apparatuses will be described.

The information storage apparatus 101, the PC 102, and the relay server 103 have a configuration of a common computer.

Figure 2:
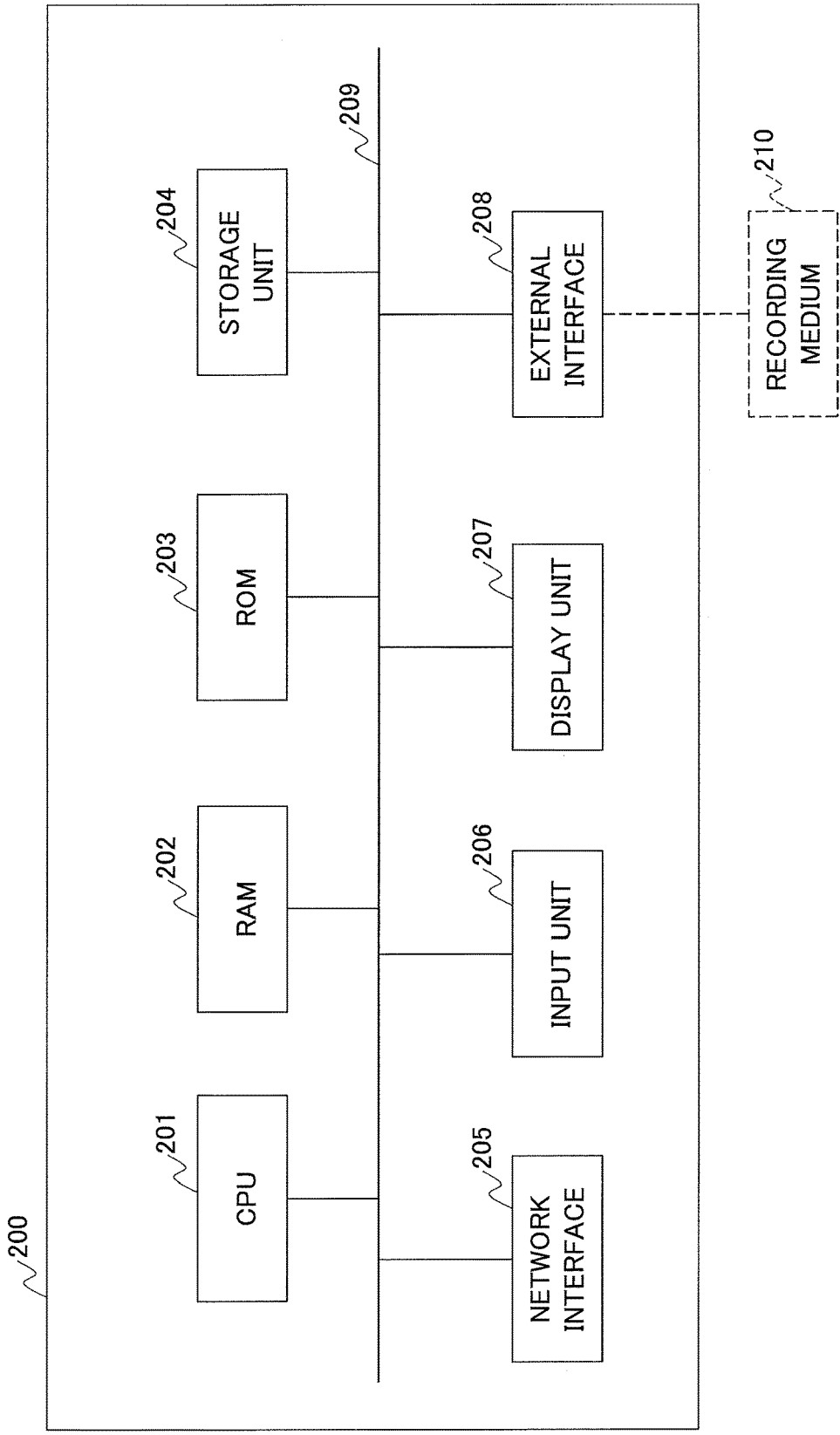
FIG. 2 is a block diagram illustrating a hardware configuration of a common computer.

FIG. 2 is a block diagram illustrating a hardware configuration of a common computer of the present embodiment. For example, a computer 200 includes a CPU (Central Processing Unit) 201, a RAM (Random Access Memory) 202, a ROM (Read Only Memory) 203, a storage unit 204, a network interface 205, an input unit 206, a display unit 207, an external interface 208, a bus 209, and the like. Additionally, the input unit 206 and the display unit 207 may be connected if needed.

The CPU 201 is a processor for achieving controls and functions of entire computer 200 by retrieving the programs and data from the ROM 203, a storage unit 204, etc., to load them onto the RAM 202 and execute them. The RAM 202 is an example of a volatile memory (storage device) for temporarily storing programs and data. The ROM 203 is an example of non-volatile memory (storage device) that can keep programs and data even after turning off the power supply. For example, programs and data including BIOS executed when the computer 200 is started and respective setting information items are stored in the ROM 203.

Also, the storage unit 204 is an example of non-volatile storage device for storing programs and data. An OS that is basic software for controlling entire computer 200, an application program that is executed on the OS are included in the stored programs and data. For example, the storage unit 204 is achieved by a HDD (Hard Disk Drive), a SSD (Solid State Drive), and the like.

The network interface 205 is an interface for connecting the computer 200 to various types of networks. Thus, the computer 200 can perform data communication through the network interface 205.

For example, the input unit 206 is an input device used by the user to input respective operational signals, and includes a keyboard, a mouse, a touch panel, and the like. For example, the display unit 207 is a display device for displaying processing result of the computer 200, and includes a display (panel), and the like.

The external interface 208 is an interface for an external device. A recording medium 210 is included in the external device. Thus, the computer 200 can perform read/write operation, etc., on the recording medium 210 via the external interface 208. A USB (Universal Serial Bus) memory, various types of memory cards, etc., are included in the recording medium 210.

The bus 209 is commonly connected respective elements described above. For example, an address signal, a data signal, various types of control signals, etc., are transmitted through the bus 209.

For example, processes of the information storage apparatus 101, the PC 102, and the relay server 103 are performed by executing a program with the computer 200 illustrated in FIG. 2.

<Software Configuration>

<Functional Configuration of Information Storage Apparatus>

Figure 3:
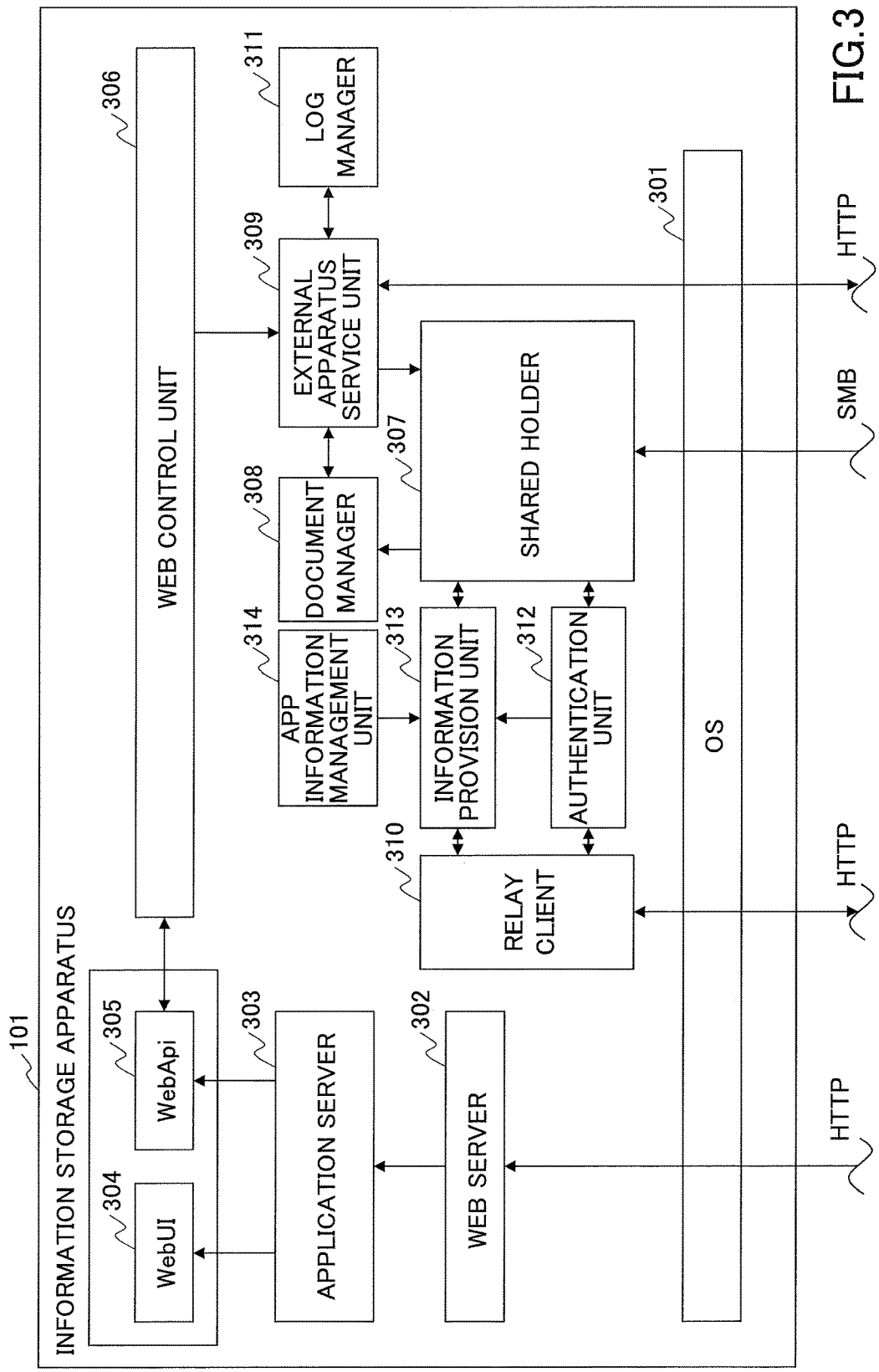
FIG. 3 is a block diagram illustrating an example functional configuration of an information storage apparatus.

FIG. 3 is a block diagram illustrating an example functional configuration of the information storage apparatus 101 of the present embodiment.

The information storage apparatus 101 includes an OS 301, a Web server 302, an application server 303, a WebUI 304, a WebApi 305, a Web control unit 306, a shared holder 307, a document manager 308, an external apparatus service unit 309, a relay client 310, a log manager 311, an authentication unit 312, an information provision unit 313, an app information management unit 314, and the like. The respective units are achieved by executing a program.

The OS 301 is an operating system of the information storage apparatus 101 for controlling entire information storage apparatus 101. The OS 301 may be WINDOWS, LINUX, or the like.

The Web server 302 is a software product for transmitting/receiving information according to HTTP (Hyper Text Transfer Protocol). For example, the web server 302 may be APACHE, IIS, or the like.

For example, the application server 303 is a software product that is operated as a plug-in of the Web server 302. For example, the application server 303 may be TOMCAT, or the like.

The WebUI 304 displays system setting screen according to HTTP request. The user can change setting information through the system setting screen by using a Web browser, and the like.

The WebApi (Application Programming Interface) 305, which can be used through a network, receives the HTTP request to perform a process according to the HTTP request, and transmits HTTP response. The WebApi 305 is an interface (API) defined in advance for receiving a request from the terminal apparatus such as a PC 102. For example, the WebApi 305 is formed by functions and classes.

The Web control unit 306 performs a process for controlling the external apparatus service unit 309 in response to a request from the WebApi 305.

The shared holder 307 is a folder that can be accessed and used according to SMB (Server Message Block) protocol. The user uses the file, etc., stored in the shared holder 307 by using the terminal apparatus, such as the PC 102b, connected to a network inside the intranet 105.

The document manager 308 manages files stored in the shared holder 307, and performs a file conversion process according to a request from the external apparatus service unit 309. Additionally, in the present embodiment, the file is handled as a type of data.

The external apparatus service unit 309 performs a process for transmitting a request to a Web service unit of an electronic apparatus 107.

The relay client 310 accesses the relay server 103 to acquire request information indicating a request of process from the PC 102, and the like.

Preferably, the relay client 310 can acquire the request information transmitted from the PC 102b connected to a network inside the intranet 105 according to HTTP without interposing the relay server 103.

The log manager 311 performs a process for managing log data (log information).

The authentication unit 312 performs an authentication operation with respect to request information received through the relay client 310, the shared holder 307, or the like. For example, in a case where authentication information registered in advance is included in the request information, the request information is successfully authenticated by the authentication unit 312.

Additionally, the authentication information registered in advance includes user's authentication information (e.g., user ID and password) kept by the client application program 111 and authentication information (e.g., app ID and app password) of the app registered in the external application program 112.

The information provision unit 313 change the folder structure provided to the PC 102 that has transmitted the request information according to identification information of app in a case where the identification of app registered in advance is included in the request information successfully authenticated by the authentication unit 312.

For example, in a case where identification information of the external application program 112 is not included in the request information successfully authenticated by the authentication unit 312, the information provision unit 313 provides a default file structure to the PC 102.

On the other hand, in a case where valid identification information of the external application program 112 is included in the request information successfully authenticated by the authentication unit 312, the information provision unit 313 provides file list information to the PC 102, where the folder dedicated for the external application program 112 is included in the file list.

For example, the app information management unit 314 manages identification information of app (e.g., app ID), activation code for validating the identification information of app, a state (valid/invalid) of the identification information of app, and the like, where the identification information of app is registered in the external application program 112 in advance. For example, the app information management unit 314 stores app information as illustrated in FIG. 8A in the storage unit illustrated in FIG. 2 to manage the app information. Additionally, the app information illustrated in FIG. 8A will be described below.

<Functional Configuration of PC>

Figure 4:
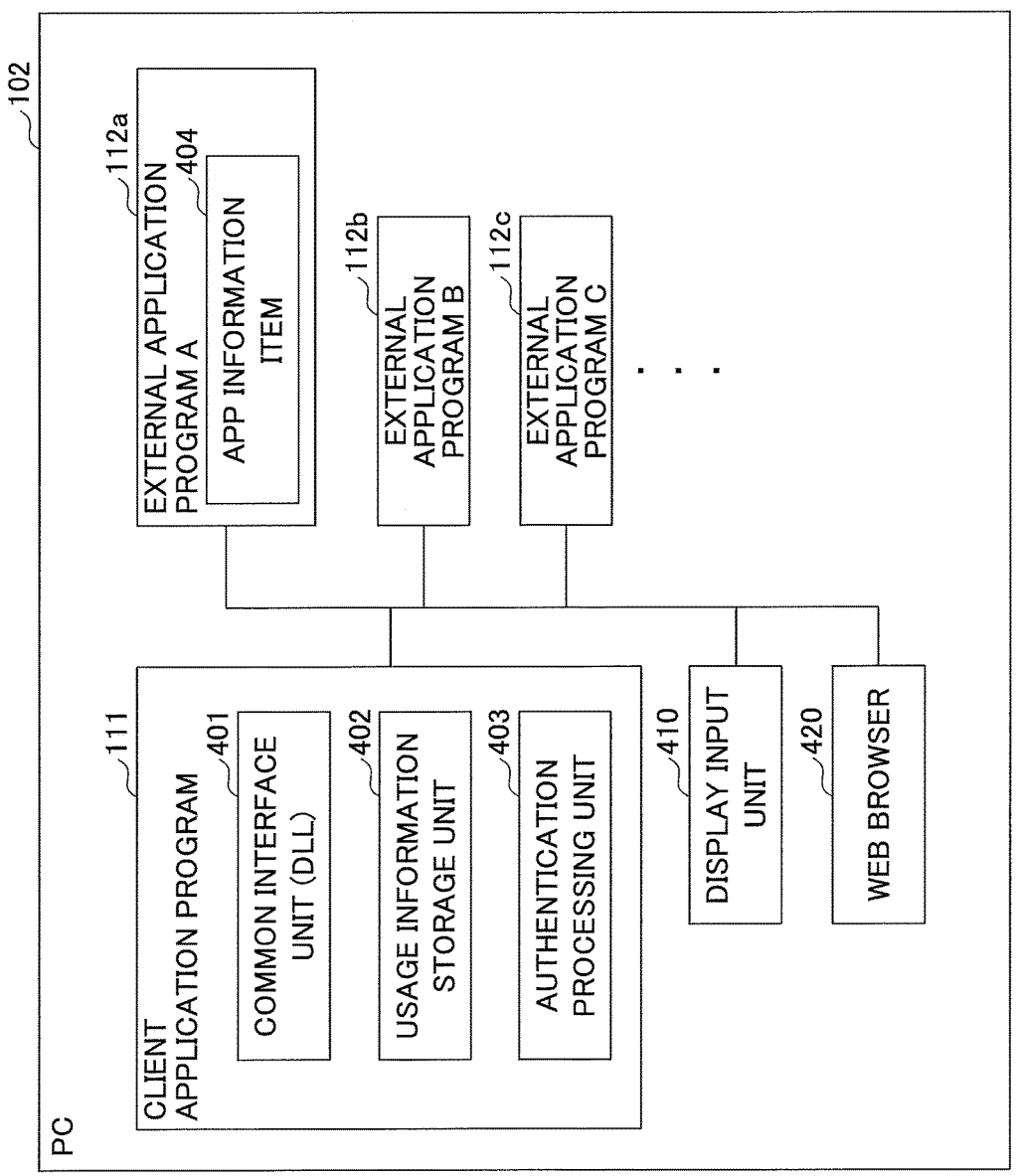
FIG. 4 is a block diagram illustrating an example functional configuration of the PC.

FIG. 4 is a block diagram illustrating an example functional configuration of the PC of an embodiment of the present disclosure.

The PC 102 includes the client application program 111, an external application program A112a, an external application program B112b, an external application program C112c, a display input unit 410, a web browser 420, and the like. Additionally, in the following, any one of the external application program A112a, external application program B112b, and external application program C112c may be referred to as an external application program 112.

The client application program (first application) 111 is app provided for using the file, etc., stored in the information storage apparatus 101 by the PC 102. For example, the client application program 111 includes a common interface unit 401, a usage information storage unit 402, an authentication processing unit 403, and the like.

The usage information storage unit 402 is provided for storing the usage information including authentication information (e.g., user ID and user password) for using the information storage apparatus 101. For example, the usage information storage unit 402 is achieved by the storage unit 204 illustrated in FIG. 2, a program executed by the CPU 201 illustrated in FIG. 2, and the like.

FIG. 8D is a diagram illustrating example usage information stored in the usage information storage unit 402. In the example illustrated in FIG. 8D, items of "relay server host", "file server ID", "IP address", "user ID", "user password", "device ID" are included in the usage information.

The "relay server host" is an information item indicating a host name, etc., for identifying the relay server 103. The "file server ID" is identification information for identifying the information storage apparatus 101. The "IP address" indicates an IP address allocated to the information storage apparatus 101. The client application program 111 can access an information storage apparatus 101 based on the above described information.

The "user ID" is identification information for identifying the user. The "user password" is authentication information such as a password corresponding to the "user ID". The "device ID" is identification information (e.g., individual identification information embedded in a production process or MAC address) for identifying the PC 102. Additionally, the "user ID" and the "user password" are examples of authentication information used for accessing the information storage apparatus 101 from the client application program 111.

The common interface unit (DLL) 401 provides the external application program 112 executed in the PC 102 with an interface for transmitting request information to the information storage apparatus 101. For example, the common interface unit 401 is achieved by a program executed by the CPU 201 illustrated in FIG. 2.

For example, the common interface unit 401 has a configuration of DLL of WINDOWS. However, DLL is an example of the common interface unit 401, and this is a non-limiting example. Additionally, in the following, the common interface unit 401 may be referred to as DLL 401.

The authentication processing unit 403 is provided for performing processes related to authentications performed between the PC and the information storage apparatus 101, and is achieved by a program executed by the CPU 201 illustrated in FIG. 2.

For example, the authentication processing unit 403 performs a certain authentication process (pairing) between the PC 102 and the information storage apparatus 101, and stores the usage information including authentication information (e.g., user ID and user password) for using the information storage apparatus 101 in the usage information storage unit 402. At this time, the information storage apparatus 101 also stores authentication information (e.g., user ID, user password, and device ID) of the user corresponding to the client application program 111 as user information.

The client application program 111 can use functions provided by the information storage apparatus 101, where input operation of user ID and password can be omitted by using the authentication information of the user.

The external application program 112 includes an app information item 404 including identification information (app ID) of an app registered in advance, an app password, a path information to the folder dedicated for the external application program 112, and the like. Preferably, the app information item 404 is embedded in the external application program 112 when the external application program 112 is created.

Also, the external application program 112 transmits request information including the authentication information of the app or the authentication information of the user to the information storage apparatus 101. For example, in response to accepting a common operation (e.g., acquisition of file list) of the user, the external application program 112 transmits request information including the authentication information of the user stored by the client application program 111 to the information storage apparatus 101 through the DLL 401.

On the other hand, in response to accepting a specific operation of the user, the external application program 112 transmits request information including the identification information of the app included in the external application program 112 to the information storage apparatus 101. Additionally, for example, the specific operation includes an operation corresponding to an instruction to perform a process using a file in a format specific to the external application program 112.

For example, a display input unit 410 displays an activation screen, a function list screen, etc. (described below) in the display unit 207, and accepts the user's input operation through the input unit 206.

For example, a Web browser 420 is a general-purpose Web browser that is provided with an OS, or the like.

<Process Flow>
<Activation Process>

The activation process is performed for validating the identification information (or authentication information) of the app registered in the external application program 112 in advance. For example, the activation process is performed to validate the authentication information of the app in response to the user's operation after the external application program 112 is installed in the PC 102. Thus, for example, the user can use the folder dedicated for the external application program 112.

Figure 5:
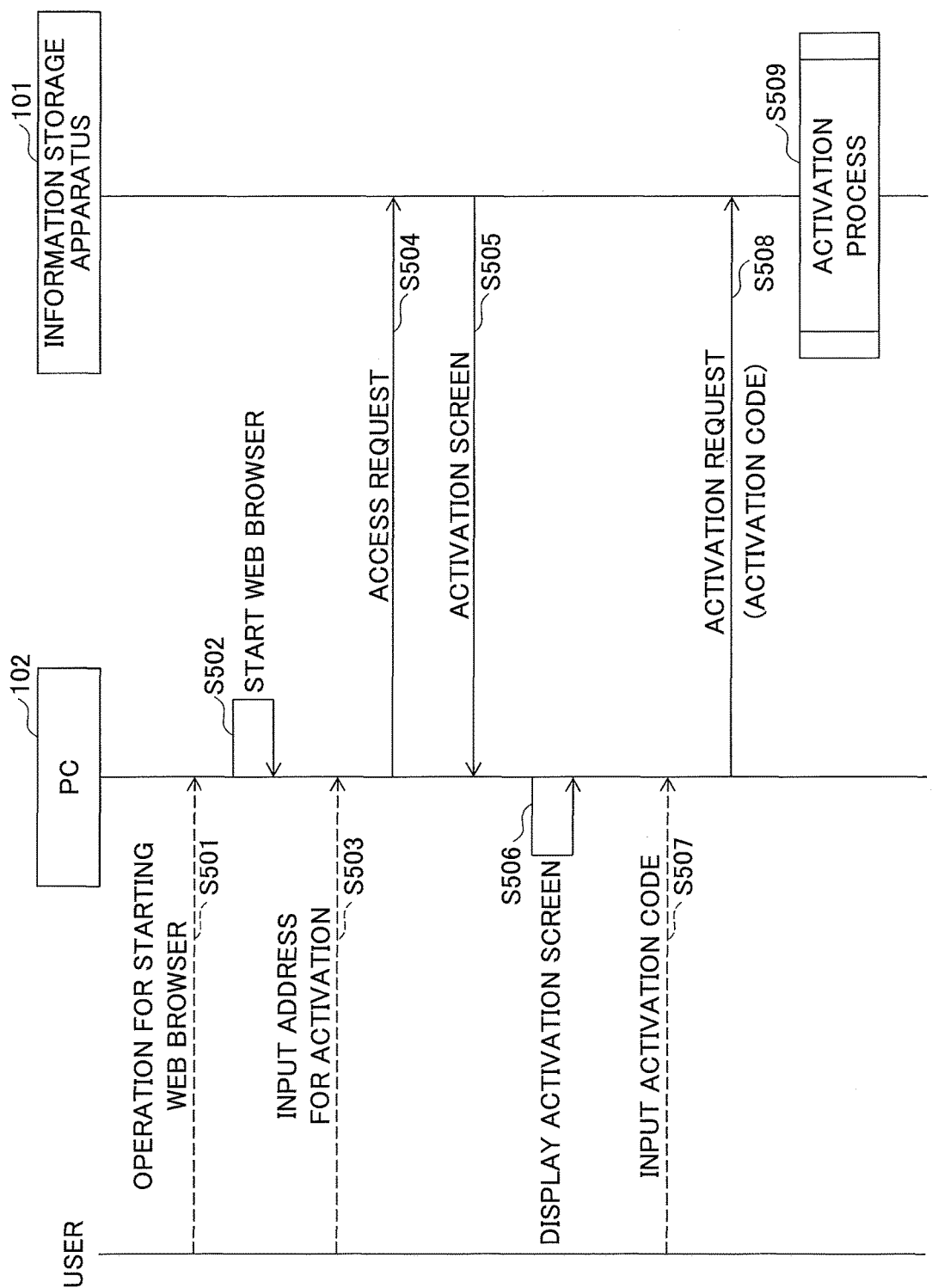
FIG. 5 is a sequence diagram illustrating an example activation process performed by the information processing system.

FIG. 5 is a sequence diagram illustrating an example activation process performed by the information processing system of the present embodiment.

In step S501, the user of the PC 102 inputs an operation for starting the Web browser 420 of the PC 102.

In step S502, the PC 102 starts the Web browser 420 in response to the operation for starting the Web browser 420.

In step S503, the user inputs an address for activation, URL (Uniform Resource Locator) for activation, etc., in the Web browser 420.

In step S503, the Web browser 420 of the PC 102 transmits a request to allow an access to a Web page for the activation to the information storage apparatus 101.

In step S504, in response to receiving the request to allow an access to the Web page for the activation, the information storage apparatus 101 causes the Web browser 420 of the PC 102 to display the activation screen. In step S506, the Web browser 420 of the PC 102 displays the activation screen in the display unit 207, and the like. An example activation screen displayed in step S506 is illustrated in FIG. 6.

Figure 6:
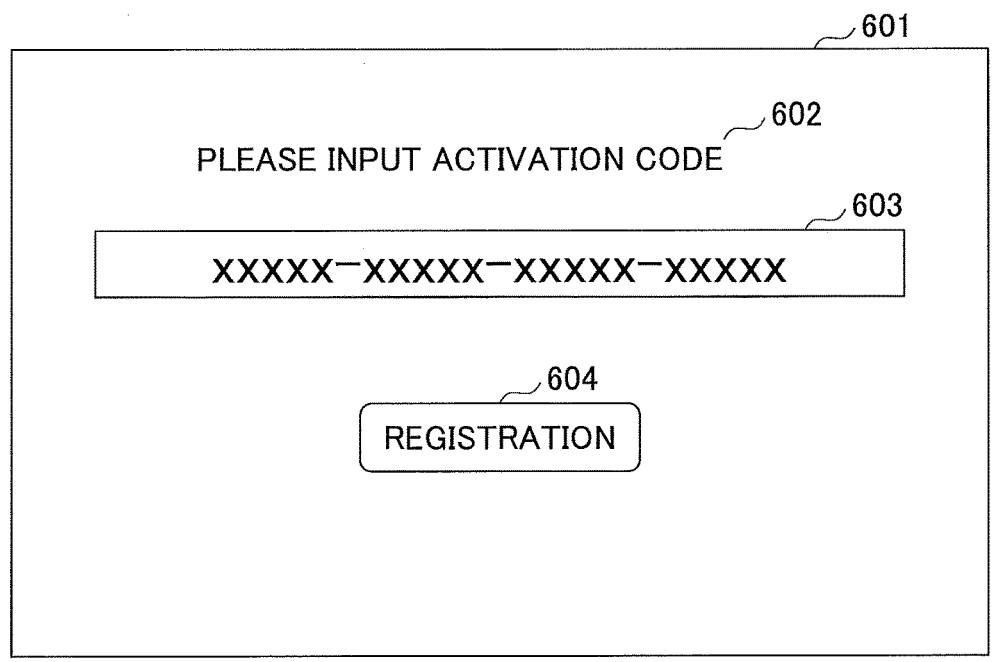
FIG. 6 is a diagram illustrating an example activation screen.

FIG. 6 is a diagram illustrating an example activation screen of the present embodiment. In the activation screen 601 illustrated in FIG. 6, a message 602 for prompting the user to input an activation code, an input field 603 for the activation code, a registration button 604, etc., are displayed.

In step S507 of FIG. 5, for example, the user inputs the activation code of the external application program 112 in the input field 603 illustrated in FIG. 6 to press the registration button 604, where the user acquires the activation code through a contract, and the like.

In step S508, an activation request including the activation code input in the activation screen 601 is transmitted from the PC 102 to the information storage apparatus 101.

In step S509, in response to receiving the activation request, the information storage apparatus 101 performs the activation process by using the activation code included in the activation request.

FIG. 7A is a flowchart illustrating the activation (validation) process performed by the information storage apparatus of a present embodiment of the present disclosure.

The process illustrated in FIG. 7A corresponds to "activation process" performed in step S509 of FIG. 5.

In step S701, the app information management unit 314 of the information storage apparatus 101 verifies the activation code received from the PC 102. For example, the activation code is successfully verified if the received activation code is recorded in app information (described below), while the verification of the activation code is resulted in failure if the received activation code is not recorded in app information.

In a case where the verification of the activation code is resulted in failure, the app information management unit 314 terminates the process. On the other hand, in a case of successful verification, the process is forwarded to step S702.

In step S702, the app information management unit 314 determines whether a dedicated folder corresponding to the activation code is included in the shared holder 307 based on the app information managed by the app information management unit 314.

FIG. 8A is a diagram illustrating an example app information managed by the app information management unit 314. As illustrated in FIG. 8A, the app information managed by the app information management unit 314 includes items of "app ID" (example identification information of app), "app password", "activation code", "path information to dedicated folder", and "state", which are provided on an application program-by-application program basis. For example, in FIG. 8A, in a case where the activation code is "xxxxx-xxxxx-xxxxx-xxxxx", the corresponding path information to dedicated folder is "¥shared¥dedicated folder1". The app information management unit 314 determines whether the path information to dedicated folder corresponding the activation code is recorded in step S702 of FIG. 7A.

In a case where the dedicated folder corresponding to the activation code does not exist, the app information management unit 314 creates a dedicated folder corresponding to the activation code in step S703, and the process is forwarded to step S704.

On the other hand, in a case where the dedicated folder corresponding to the activation code exists, the app information management unit 314 does not create the dedicated folder while the process is forwarded to step S704.

In step S704, the app information management unit 314 validates an access authority to the dedicated folder corresponding to the activation code (activation). Thus, the folder dedicated for the external application program 112 can be used by using the app ID of the external application program 112 corresponding to the activation code.

For example, the app information management unit 314 sets the "state" in the app information illustrated in FIG. 8A to be "valid". Then, the dedicated folder can be used by using the app ID and app password of the external application program 112.

FIG. 7B is a flowchart illustrating an example deactivation process. The process illustrated in FIG. 7B may be performed instead of the process illustrated in FIG. 7A.

In step S711, in response to receiving a deactivation request for invalidating the access authority to the dedicated folder from the PC 102, the app information management unit 314 of the information storage apparatus 101 performs a process of step S712.

In step S712, the app information management unit 314 invalidates the access authority to the dedicated folder corresponding to the activation code included in the received deactivation request (deactivation). For example, the app information management unit 314 sets the "state" in the app information illustrated in FIG. 8A to be "invalid". Then, the dedicated folder cannot be used by using the authentication information (app ID and app password) of app. Additionally, at this time, the app information management unit 314 does not delete the dedicated folder corresponding to the invalidated (deactivated) activation code.

First Embodiment

FIG. 8A-FIG. 8D are diagrams illustrating information managed by the information processing system of the first embodiment.

<App Information Managed by Information Storage Apparatus>

FIG. 8A is a diagram illustrating an example app information managed by the app information management unit 314 of the information storage apparatus 101. In the example illustrated in FIG. 8A, items of "app ID", "app password", "activation code", "path information to dedicated folder", "state", etc., which are provided on an application program-by-application program basis, are included in the app information managed by the information storage apparatus 101.

The "app ID" and the "app password" are authentication information of the app that is registered in advance on an application program-by-application program basis. The app ID is identification information for identifying the app. For example, in a case where the external application program A112a is installed in the PC 102a and in the PC 102b, the respective external application programs A112a installed in the PC 102a and the PC 102b have the same app ID.

The "activation code" is information for validating the dedicated folders corresponding to respective application programs.

The "path information to dedicated folder" indicates paths to the dedicated folders corresponding to the respective application programs.

The "state" indicates whether the dedicated folders corresponding to the respective application programs are valid or invalid.

For example, the app information management unit 314 stores these information items in advance, and updates the "state" in accordance with the activation request and the deactivation request from the PC 102.

<App Information Registered in App>

FIG. 8B is a diagram illustrating the app information registered (recorded) in an external application program A of the PC 102. In the example illustrated in FIG. 8B, items of "app ID", "app password", "path information to dedicated folder", etc., are included in the app information registered in the external application program A. These items respectively correspond to the "app ID", "app password", and "path information to dedicated folder" in the app information managed by the information storage apparatus 101 illustrated in FIG. 8A.

Additionally, the "app ID" and the "app password" illustrated in FIG. 8A and FIG. 8B are examples of the authentication information of the app. In the present embodiment, the external application program 112 accesses the information storage apparatus 101 according to SMB protocol, where the "app ID" is used as the user ID and the "app password" is used as the password so that an authentication function provided by the OS can be used without any change.

<User Information Managed by Information Storage Apparatus>

FIG. 8C is a diagram illustrating example user information managed by the authentication unit 312 of the information storage apparatus 101. The authentication unit 312 manages the "device ID", the "user ID", the "user password", etc., acquired from the client application program 111 of PC 102 as the user information, where the authentication unit 312 and the client application program 111 are paired in advance.

For example, the authentication unit 312 successfully authenticates request information in a case where a combination of the "device ID", the "user ID", and the "user password" included in the user information is included in the request information that is received from the PC 102 via the relay server 103.

<Usage Information Managed by Client Application Program of PC>

FIG. 8D is a diagram illustrating example usage information managed by the client application program 111 of the PC 102. As described above, the items of "relay server host", "file server ID", "IP address", "user ID", "user password", "device ID", etc., are included in the usage information.

The "relay server host", the "file server ID", and the "IP address" are example information for accessing the information storage apparatus 101 by the client application program 111. Also, the "user ID", the "user password", and the "device ID" are example authentication information of the user managed by the client application program 111.

<System Configuration>

FIG. 9 is a diagram illustrating an example configuration of the information processing system of the first embodiment. In the first embodiment, descriptions are given in a case where the PC 102, as the PC 102b, is connected to a network inside the intranet 105.

In the example illustrated in FIG. 9, similarly to the PC 102a connected to a network outside the intranet 105, the external application program 112 of the PC 102b connected to a network inside the intranet 105 can also access the information storage apparatus 101 via the relay server 103.

In this case, the external application program 112 requests the client application program 111 to transmit request information for providing information to the information storage apparatus 101 by using the DLL 401 provided by the client application program 111. In response to the request from the external application program 112, the client application program 111 transmits the request information including the authentication information of the user managed by the client application program 111 to the information storage apparatus 101 via the relay server 103. Here, for example, the communication between the client application program 111 and the relay server 103 and between the relay server 103 and the information storage apparatus 101 are performed according to HTTP (Hyper Text Transfer Protocol).

Also, for example, the external application program 112 of the PC 102b connected to a network inside the intranet 105 can access the information storage apparatus 101 according to SMB protocol. Additionally, the SMB protocol is an example file sharing protocol other than the protocol (HTTP) with which the client application program 111 transmits the request information to the information storage apparatus 101.

In this case, the external application program 112 of the PC 102*b* transmits the request information including the authentication information of app stored in the usage information storage unit 402 of the external application program 112 to the information storage apparatus 101.

Figure 10:
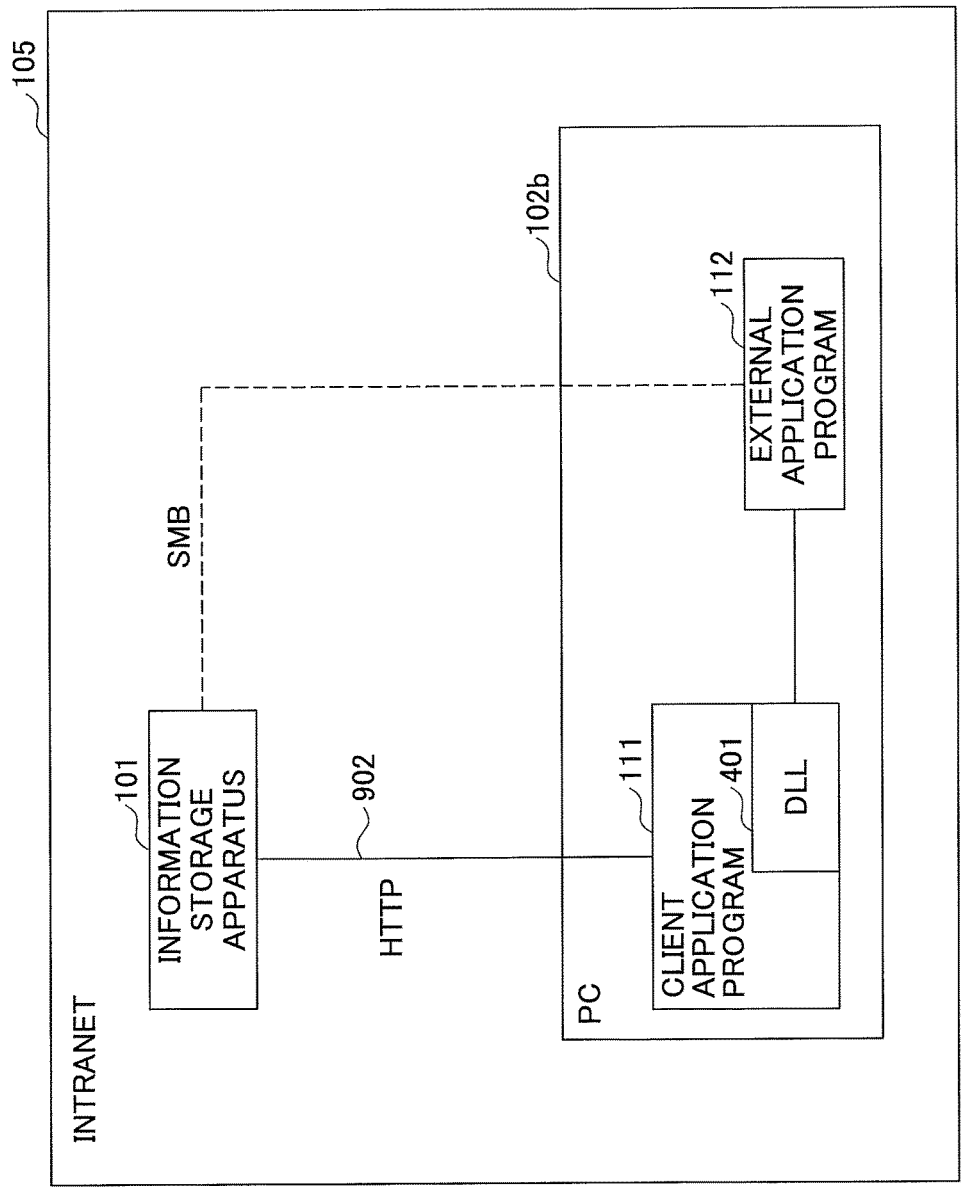
FIG. 10 is a diagram illustrating another example configuration of the information processing system of the first embodiment.

FIG. 10 is a diagram illustrating another example configuration of the information processing system of the first embodiment. As illustrated in FIG. 10, the external application program 112 of the PC 102*b* may transmit the request information to the information storage apparatus 101 without interposing the relay server 103 outside the intranet 105. In this case, for example, in response to the request from the external application program 112, the client application program 111 transmits the request information including the authentication information of the user managed by the client application program 111 to the information storage apparatus 101 according to HTTP.

<Process Flow>
<Process of Information Storage Apparatus>

Figure 11:
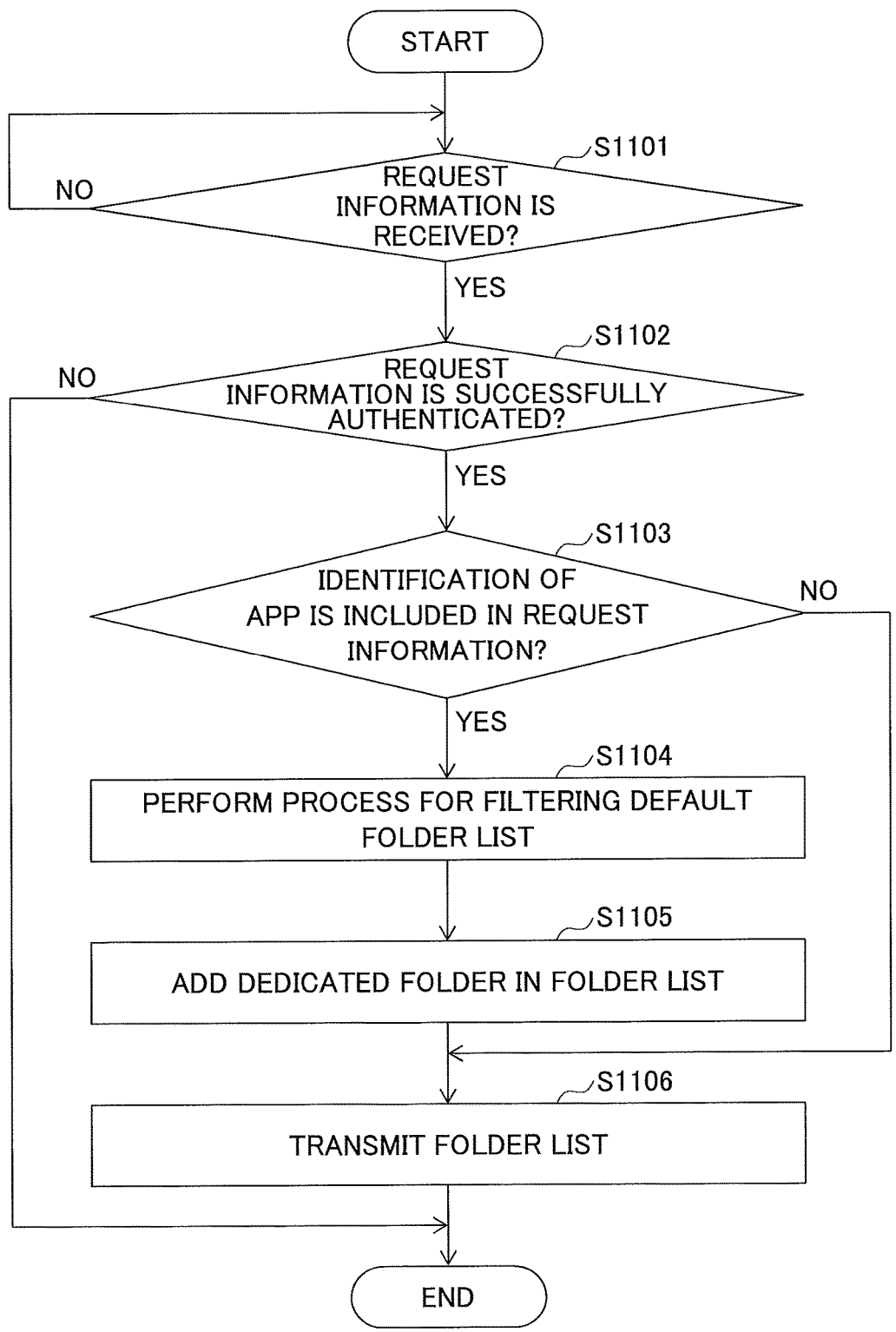
FIG. 11 is a flowchart illustrating an information provision process performed by the information storage apparatus of the first embodiment.

FIG. 11 is a flowchart illustrating an information provision process performed by the information storage apparatus of the first embodiment.

In step S1101, in response to receiving the request information transmitted from the PC 102, the information storage apparatus 101 performs processes of step S1102, S1103, and the like.

In step S1102, the authentication unit 312 of the information storage apparatus 101 authenticates the request information transmitted from the PC 102. In a case where the request information is not successfully authenticated, the authentication unit 312 terminates the process. On the other hand, in a case where the request information is successfully authenticated, the process is forwarded to step S1103.

For example, in a case where any of the authentication information (user ID and user password) of the user managed by the authentication unit 312 and the authentication information (app ID and app password) of the app managed by the app information management unit 314 is included in the request information, the request information is successfully authenticated by the authentication unit 312. On the other hand, in a case where neither of the authentication information of the user managed by the authentication unit 312 and the authentication information of the app managed by the app information management unit 314 is included in the request information, the authentication of the request information is resulted in failure.

In step S1103, the information provision unit 313 of the information storage apparatus 101 determines whether the identification information (e.g., app ID) is included in the request information, thereby changing information that is to be provided to the PC 102 in accordance with the determination result.

In the present embodiment, the external application program 112 of the PC 102 transmits the request information through the DLL 401 of the client application program 111 in a case where the external application program 112 requests the information storage apparatus 101 to perform a common process (e.g., file list acquisition), where the common process may be also requested by other external application programs 112. In this case, the authentication information of the user is included in the request information.

On the other hand, for example, the external application program 112 of the PC 102 transmits the request information according to SMB protocol in a case where the external application program 112 requests the information storage apparatus 101 to perform a process (e.g., "bind": described below) using the folder dedicated for the external application program 112. In this case, the authentication information of the app (app ID and app password) is included in the request information.

Therefore, the information provision unit 313 of the information storage apparatus 101 can determine the requested process to be a process using the folder dedicated for the external application program 112 in a case where the identification information (app ID) of the app is included in the request information.

Alternately, in step S1103, the information provision unit 313 may determine the requested process to be a process using the folder dedicated for the external application program 112 in a case where the protocol with which the request information is transmitted is SMB protocol.

In a case where the identification information of the app is not included in the request information, the process is forwarded to step S1106. In this case, in step S1106, information indicating a default folder list is transmitted to the external application program 112 of the PC 102. Additionally, for example, files in the shared holder, "search folder", "workflow folder", files in a private folder, etc., are included in the default folder list.

On the other hand, in a case where the identification information of the app is included in the request information, the process is forwarded to step S1104.

In step S1104, the information provision unit 313 performs a process for filtering the default folder list. For example, the information provision unit 313 deletes certain items such as the private folder, the files in the shared folder, the search folder, workflow folder, etc., from the default folder list.

In step S1105, the information provision unit 313 adds a dedicated folder corresponding to the external application program 112 in the folder list.

In step S1105, information indicating the folder list including the folder dedicated for the external application program 112 is transmitted to the external application program 112 of the PC 102.

According to the above described processes, the information storage apparatus 101 can provide the information indicating the folder list including the folder dedicated for the external application program A112*a* in response to the request information from the external application program A112*a* of the PC 102, where a process using the folder dedicated for the external application program A112*a* is requested by the request information. Similarly, the information storage apparatus 101 can provide the information indicating the folder list including the folder dedicated for the external application program B112*b* in response to the request information from the external application program B112*b* of the PC 102, where a process using the folder dedicated for the external application program B112*b* is requested by the request information.

In this way, the information storage apparatus 101 of the present embodiment can easily change folder structure that is provided to a terminal apparatus according to application program of the terminal apparatus, which requests the information stored in the information storage apparatus 101.

<Process of Information Processing System>

Figure 12:
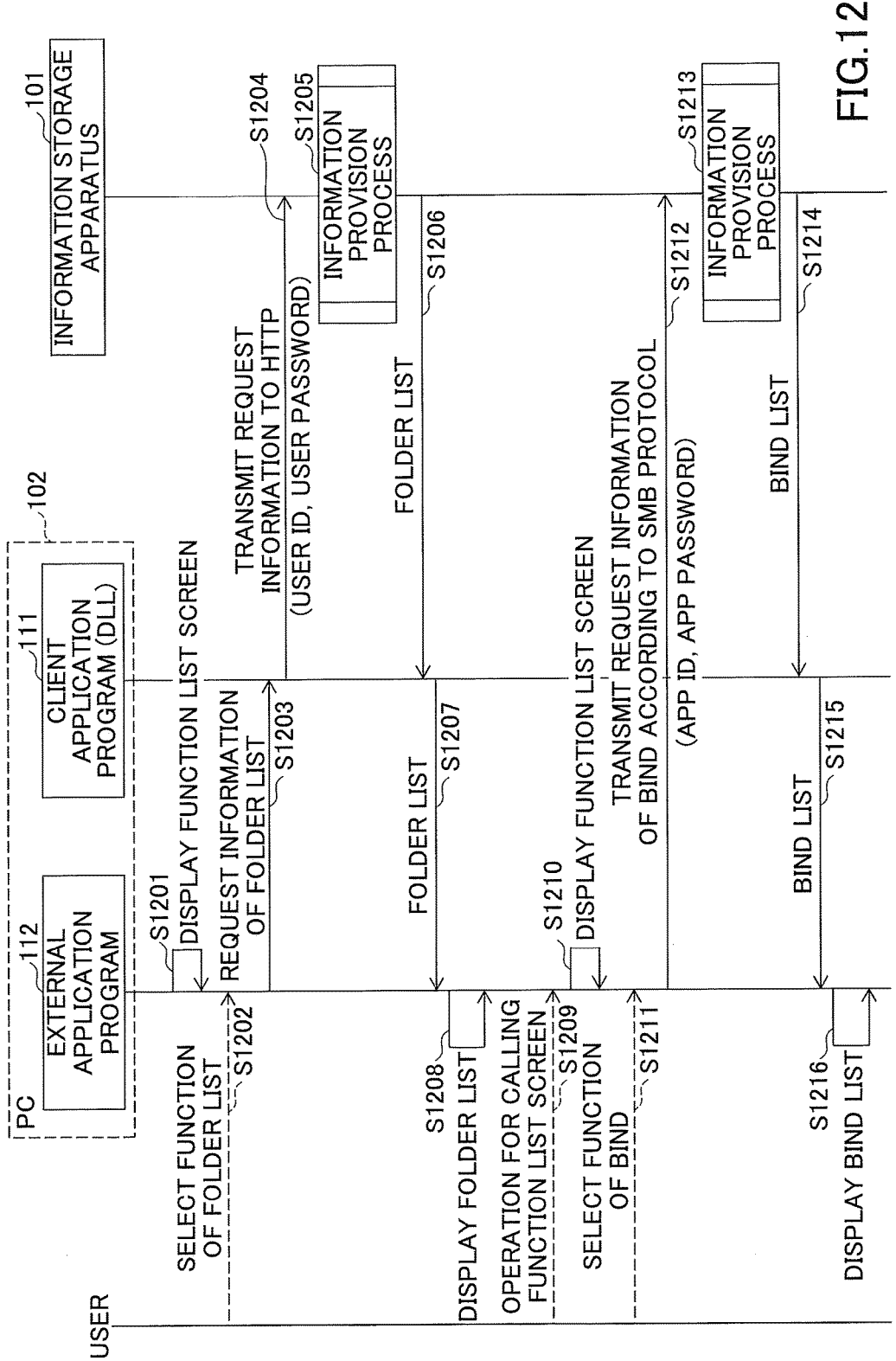
FIG. 12 is a sequence diagram illustrating a process of the information processing system.

In the following, a process of the entire information processing system 100 will be described. Additionally, in the following, descriptions are given in a case where the client application program 111 of the PC 102*b* transmits the request information to the information storage apparatus 101 without interposing the relay server 103 as illustrated in FIG. 10. FIG. 12 is a sequence diagram illustrating the process of the entire information processing system 100.

In step S1201, for example, the external application program 112 of the PC 102 displays a function list screen in the display unit 207 in response to operations of the user of the PC 102, and the like. An example function list screen displayed in the display unit 207 in step S1201 is illustrated in FIG. 13A.

In the example illustrated in FIG. 13A, a plurality of functions such as folder list 1311 and bind 1312 are displayed in the function list screen 1310 in a selectable manner.

For example, upon the user selecting the folder list 1311, a list of folders that can be used by the user is displayed in the display unit 207, etc., of the PC 102, where the information storage apparatus 101 allows the user to use the folders included in the displayed list. Additionally, the folder list 1311 is an example common function that is also provided for other external application programs 112.

Also, upon the user selecting the bind 1312, the information storage apparatus 101 causes the display unit 207 of the PC 102 to display information of the folder dedicated for the external application program 112. Additionally, the bind 1312 is an example process or function using the folder dedicated for the external application program 112.

For example, the bind 1312 is a function for displaying, printing, etc., a plurality of files, where the displayed, printed, etc., files are bound. The bind 1312 requires a data file in a specific format. Therefore, preferably, the specific data file used by the bind 1312 is stored in the folder dedicated for the external application program 112 so that the specific data file can be used only when the bind 1312 is selected.

Here, in step S1202, the user selects the function of folder list 1311 in the function list screen 1310 illustrated in FIG. 13A.

In this case, in step S1203, the external application program 112 of the PC 102 transmits a request for folder list through the DLL 401 of the client application program 111.

For example, in step S1204, the client application program 111 of the PC 102 transmits the request information of the folder list to the information storage apparatus 101 according to HTTP. For example, the authentication information (user ID and user password) of the user managed by the client application program 111 is included in the request information.

In step S1205, the information storage apparatus 101 performs the information provision process illustrated in FIG. 11. In this case, the information storage apparatus 101 provides the PC 102 with information indicating the default folder list because the identification information of the app is not included in the request information.

In steps S1206 and S1207, the information indicating the default folder list is transmitted to the external application program 112 of the PC 102.

In step S1208, the external application program 112 of the PC 102 displays the folder list provided from the information storage apparatus 101 in the display unit 207, etc., of the PC 102. An example folder list screen displayed in the display unit 207, etc., in step S1208 is illustrated in FIG. 13B.

In the example illustrated in FIG. 13B, a shared folder 1321 that is common to a plurality of users and a private folder 1322 that corresponds to an individual user are displayed. Additionally, "file", "search", "workflow", etc., illustrated in FIG. 13 are examples of files and folders included in the shared folder 1321 and the private folder 1322.

In response to the user inputs an operation for calling the function list screen in step S1209 of FIG. 12, the external application program 112 of the PC 102 displays the function list screen 1310 illustrated in FIG. 13A again in the display unit 207 in step S1210.

In this example, in step S1211, the user selects the bind 1312 in the function list screen 1310.

In this case, for example, the external application program 112 of the PC 102 transmits request information of the function "bind" according to SMB protocol (without using the DLL 401 of the client application program 111) to the information storage apparatus 101 in step S1212. For example, the authentication information of the app including the app ID and the app password is included in the request information.

In step S1213, the information storage apparatus 101 performs the information provision process illustrated in FIG. 11. Here, the information storage apparatus 101 provides the PC 102 with information of the folder list (bind list) including the folder dedicated for the external application program 112 because the identification information (app ID) of the app is included in the request information.

In steps S1214 and S1215, information of a bind list is transmitted to the external application program 112 of the PC 102.

In step S1216, the external application program 112 of the PC 102 displays the bind list based on the information received from the information storage apparatus 101 in the display unit 207, etc., of the PC 102, where the received information corresponds to the folder structure. An example bind list screen displayed in the display unit 207, etc., in step S1216 is illustrated in FIG. 13C.

In the example illustrated in FIG. 13C, a shared folder 1331 and a folder (dedicated folder 1332) dedicated for the external application program 112 are displayed in the bind list screen 1330.

Preferably, in the bind list screen 1330 illustrated in FIG. 13C, the private folder 1322 and a part of the shared folder 1321 that are displayed in the folder list screen 1320 are not displayed due to the filtering performed in step S1104 of FIG. 11.

Additionally, the "bind" is an example function specific to every external application program 112.

For example, in a case where the external application program is "external application program A112a", a function (e.g., "function A") specific to the external application program A112a is displayed in the function list screen 1310 illustrated in FIG. 13A. Also, upon the "function A" being selected in the function list screen, a folder dedicated for the external application program A112a is displayed in a list screen of "function A".

Similarly, in a case where the external application program is "external application program B112b", a function (e.g., "function B") specific to the external application program B112b is displayed in the function list screen 1310 illustrated in FIG. 13A. Also, upon the "function B" being selected in the function list screen, a folder dedicated for the external application program B112b is displayed in a list screen of "function B".

As described above, according to the present embodiment, the information processing system 100 can be achieved, in which folder structure that is provided to the PC 102 can be easily changed according to application program, which requests information stored in the information storage apparatus, executed in the PC 102.

Second Embodiment

In the first embodiment, descriptions are given in a case where the PC 102 is connected to a network inside the intranet 105. In the second embodiment, descriptions are given in a case where the PC 102 is connected to a network outside the intranet 105 (or may be inside the intranet 105).

FIG. 14A and FIG. 14B are diagrams illustrating example information managed by the information processing system of the second embodiment.

<App Information Managed by Information Storage Apparatus>

FIG. 14A is a diagram illustrating example app information managed by the information storage apparatus 101. The app information managed by the information storage apparatus 101 of the present embodiment includes an item of "app identification information" instead of "app ID" and "app password" included in the app information of the first embodiment illustrated in FIG. 8A. The app identification information is example identification information of the app for identifying the external application program 112.

<App Information Registered in App>

FIG. 14B is an example app information registered in an external application program A of the PC 102. The app information registered in the external application program A includes an item of "app identification information" instead of "app ID" and "app password" illustrated in FIG. 8B indicating the app information of the first embodiment.

<System Configuration>

FIG. 15 is a diagram illustrating an example configuration of the information processing system of the second embodiment. The PC 102 of the present embodiment may be connected to a network outside the intranet 105 or may be connected to a network inside the intranet 105.

For example, the client application program 111 of the PC 102 can transmit the request information to the information storage apparatus 101 according to the HTTP without interposing the relay server 103 in a case where the PC 102 can directly access the information storage apparatus 101. Also, the client application program 111 of the PC 102 can transmit the request information to the information storage apparatus 101 via the relay server 103 in a case where the PC 102 cannot directly access the information storage apparatus 101 due to a firewall, and the like.

In the present embodiment, the external application program 112 transmits the request information to the information storage apparatus 101 by using the DLL 401 provided by the client application program 111.

<Process Flow>

<Process of Information Storage Apparatus>

Figure 16:
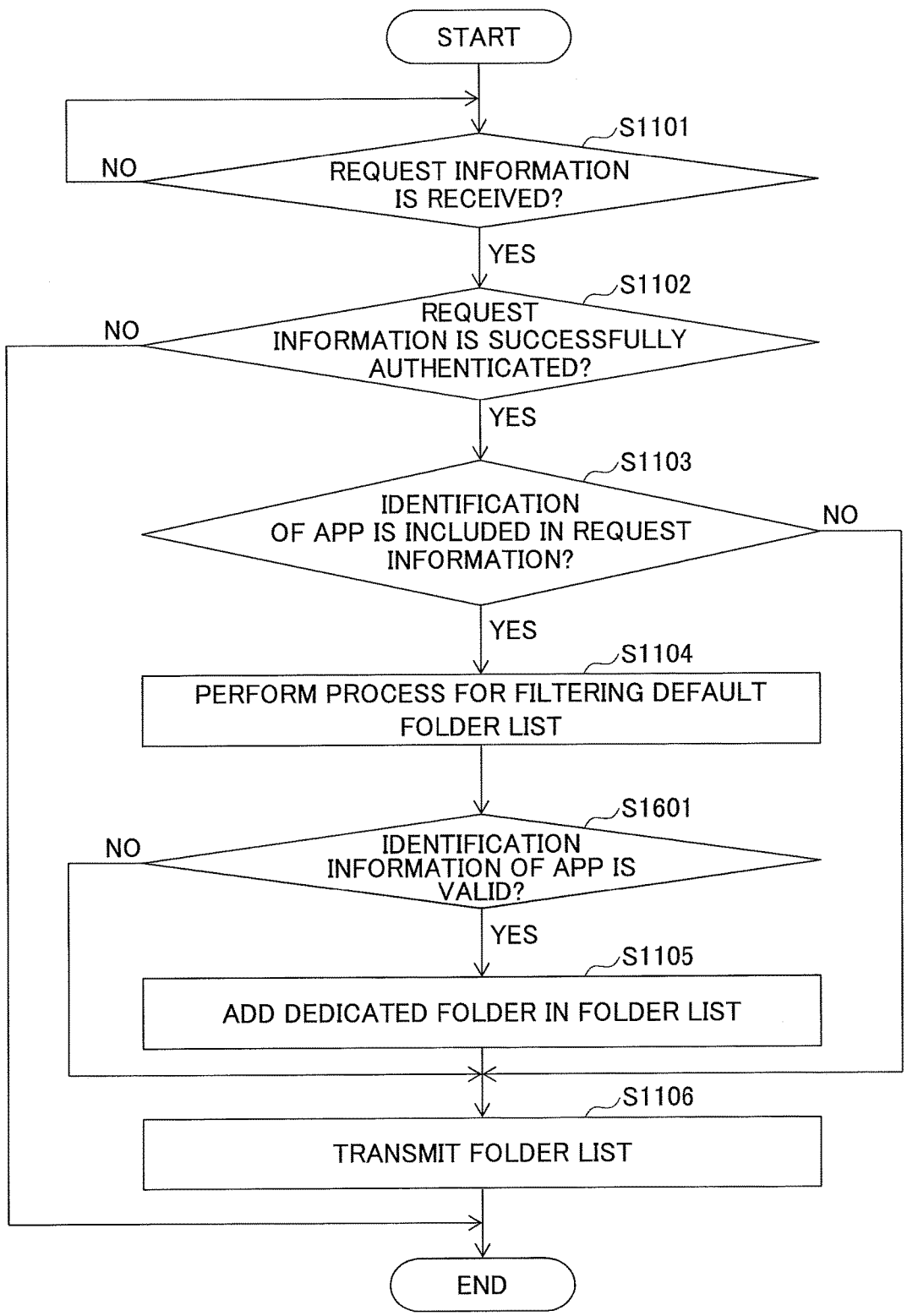
FIG. 16 is a flowchart illustrating an example information provision process of the information storage apparatus of the second embodiment.

FIG. 16 is a flowchart illustrating an example information provision process of the information storage apparatus of the second embodiment. Additionally, among steps included in the information provision process illustrated in FIG. 16, steps S1101-S1104, S1105 and S1106 are similar to corresponding steps illustrated in the information provision process of the first embodiment illustrated in FIG. 11. Therefore, here, difference between FIG. 11 and FIG. 16 is mainly described.

In the present embodiment, step S1601 is performed after step S1104 in FIG. 16.

In step S1601, the information provision unit 313 of the information storage apparatus 101 determines whether the identification information of the app (app identification information) included in the request information is valid.

In a case where the identification information of the app is valid, the information provision unit 313 adds a folder dedicated for the external application program 112 to the folder list in step S1105, and transmits the folder list to the PC 102 in step S1106.

In a case where the identification information of the app is not valid, the information provision unit 313 transmits the folder list in step S1106 without adding the folder dedicated for the external application program 112 to the PC 102.

<Process of Information Processing System>

Figure 17:
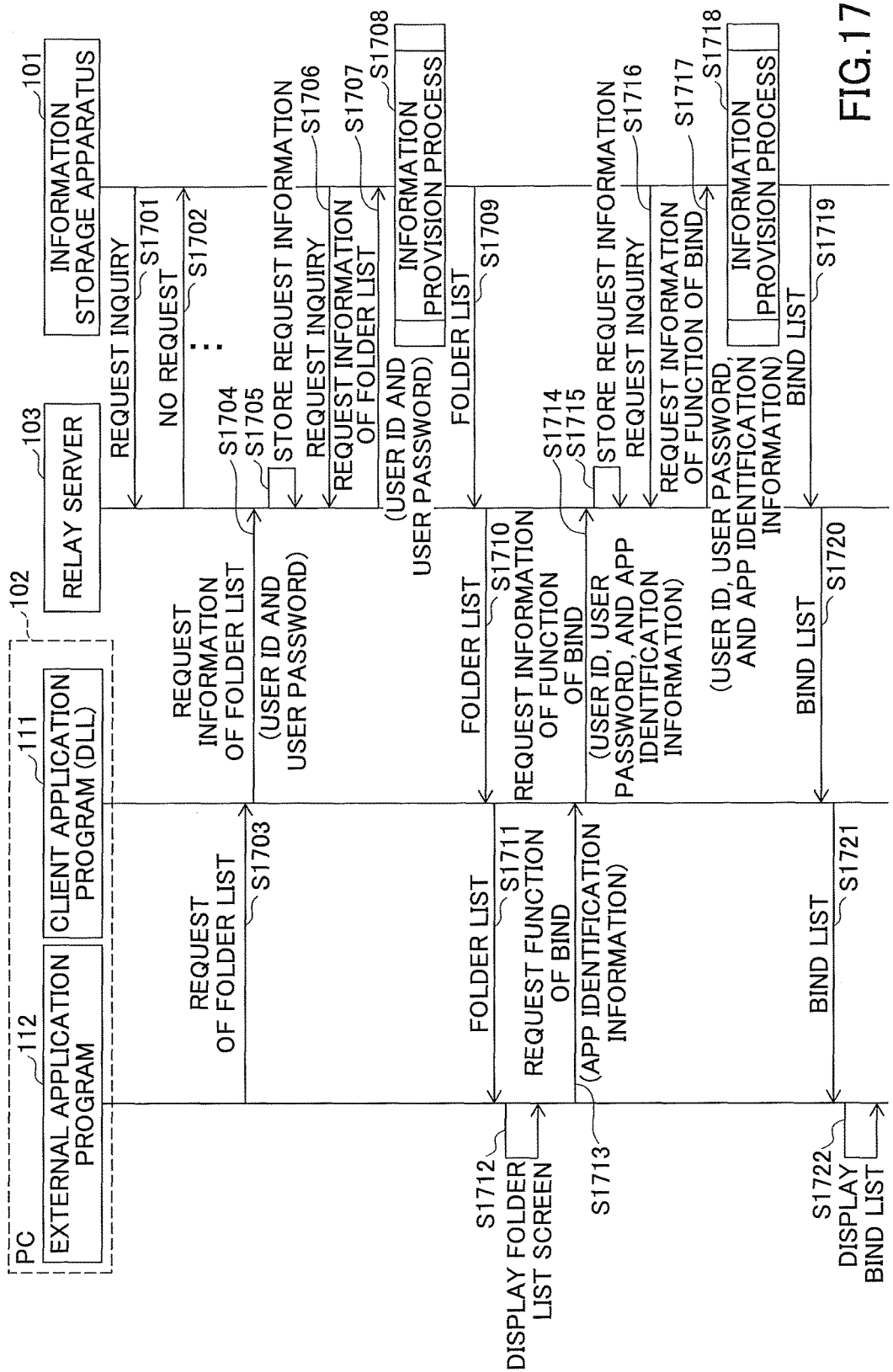
FIG. 17 is a sequence diagram illustrating a process of the information processing system of the second embodiment.

FIG. 17 is a sequence diagram illustrating a process of the information processing system of the second embodiment. Additionally, in the following, descriptions are given in a case where the client application program 111 of the PC 102 transmits the request information to the information storage apparatus 101 via the relay server 103.

In step S1701, a relay client 310 of the information storage apparatus 101 transmits a request inquiry for requiring the request information stored in the relay server 103 to the relay server 103. For example, the relay client 310 transmits the request inquiry to the relay server 103 at every predetermined interval.

In step S1702, the relay server 103 transmits response information in response to receiving the request inquiry from the information storage apparatus 101. Here, the relay server 103 transmits information "no request" indicating that no request information to the information storage apparatus 101 is stored in the relay server 103.

In step S1703, in response to the user's operation, the external application program 112 of the PC 102 requests the DLL 401 provided by the client application program 111 to provide the folder list.

In step S1704, in response to receiving the request of the folder list from the external application program 112, the client application program 111 of the PC 102 transmits the request information of the folder list to the relay server 103. For example, in the request information of the folder list, access information item 1801 illustrated in FIG. 18A is included.

FIG. 18A is a diagram illustrating an example access information item. In the example illustrated in FIG. 18A, for example, "CID", "Authorization", "deviceID", "accessType", etc., are included in the access information item 1801.

"CID" is identification information for identifying the information storage apparatus 101, and corresponds to "file server ID" included in the usage information managed by the client application program 111 of the PC 102 illustrated in FIG. 8D.

"Authorization" is authentication information recorded in the client application program 111, and corresponds to "user ID" and "user password" included in the usage information managed by the client application program 111 of the PC 102 illustrated in FIG. 8D.

"deviceID" is identification information of the PC 102 recorded in the client application program 111, and corresponds to "device ID" included in the usage information managed by the client application program 111 of the PC 102 illustrated in FIG. 8D.

"accessType" indicates a source of the request information. For example, as illustrated in FIG. 18B, the request source is the client application program 111 in a case where the "accessType" is "0", while the request source is external application program 112 in a case where the "accessType" is "1".

In step S1705, for example, the relay server 103 stores the received request information in the storage unit 204, illustrated in FIG. 2, and the like.

In step S1706, for example, the information storage apparatus 101 transmits the request inquiry to the relay server 103 at every predetermined interval.

In step S1707, in response to the request inquiry from the information storage apparatus 101, the relay server 103 transmits the request information stored in the storage unit to the information storage apparatus 101.

In step S1708, the information storage apparatus 101 performs the information provision process illustrated in FIG. 16.

Here, the authentication request of the file list transmitted from the PC 102 is successfully authenticated by the authentication unit 312 of the information storage apparatus 101 because the request information includes the authentication information of the user managed by the authentication unit 312 (YES in step S1102 in FIG. 11). Also, the request information of the file list transmitted from the PC 102 does not include the identification information of the app (NO in step S1103 in FIG. 11) Therefore, the information provision unit 313 of the information storage apparatus 101 provides the PC 102 with a default folder list (step S1106 in FIG. 11).

In step S1709-S1711 of FIG. 17, the default folder list is transmitted to the external application program 112 of the PC 102.

In step S1712, for example, the external application program 112 of the PC 102 causes the display unit 207, etc., to display a folder list screen 1320 as illustrated in FIG. 13B based on the folder list transmitted from the information storage apparatus 101.

In step S1713, in response to the user's operation, etc., the external application program 112 of the PC 102 requests the function "bind" to the DLL401 provided by the client application program 111. The app identification information registered in the external application program 112 in advance is included in the request.

In step S1714, the client application program 111 of the PC 102 transmits the request information of the function "bind" to the relay server 103. For example, access information item 1802 illustrated in FIG. 18B is included in the request information of the function "bind".

FIG. 18B is a diagram illustrating another example access information. In the example illustrated in FIG. 18B, "applicationID" is included in addition to respective items included in the access information item 1801 illustrated in FIG. 18A.

"applicationID" is identification information for identifying the external application program 112 that is the source of the request of the function "bind", and is registered in the external application program 112 in advance as illustrated in FIG. 14B.

In step S1715, the relay server 103 stores the request information of the function "bind" received from the PC 102 in the storage unit.

In step S1716, for example, the information storage apparatus 101 transmits the request inquiry to the relay server 103 at every predetermined interval.

In step S1717, in response to the request inquiry from the information storage apparatus 101, the relay server 103 transmits the request information stored in the storage unit to the information storage apparatus 101.

In step S1718, the information storage apparatus 101 performs the information provision process illustrated in FIG. 16.

Here, the request information of the function "bind" transmitted from the PC 102 is successfully authenticated by the authentication unit 312 of the information storage apparatus 101 because the request information includes the authentication information of the user managed by the authentication unit 312 (YES in step S1102 of FIG. 16). Also, the identification information of the app is included in the request information of the function "bind" transmitted from the PC 102 (YES in step S1103 of FIG. 16). Therefore, the information provision unit 313 of the information storage apparatus 101 performs a filtering process on the default folder list (step S1104 of FIG. 16).

Also, here, the app identification information included in the request information of the function "bind" is validated. In this case, the information provision unit 313 of the information storage apparatus 101 adds a folder dedicated for the external application program 112 corresponding to the app identification information in the folder list on which the filtering process has been performed (step S1105 of FIG. 16). Further, the information provision unit 313 transmits the folder list in which the dedicated folder has been added to the PC 102 (step S1106 of FIG. 16).

In steps S1719-S1721 of FIG. 17, a list of the function "bind" is transmitted to the external application program 112 of the PC 102.

In step S1722, for example, the external application program 112 of the PC 102 causes the display unit 207, etc., to display the bind list screen 1330 as illustrated in FIG. 13 based on the transmitted folder list.

As described above, according to the present embodiment, the folder structure that is provided to the PC 102 can be easily changed according to application program of the terminal apparatus, which requests the information stored in the information storage apparatus, even when the PC 102 is connected to a network outside the intranet 105.

Third Embodiment

In the second embodiment, descriptions are given in a case where the external application program 112 and the client application program 111 adds "app identification information" to the request information for requesting to use the folder dedicated for the external application program 112. In the third embodiment, the external application program 112 and the client application program 111 transmits the request information for requesting to use the folder dedicated for the external application program 112 to the information storage apparatus 101, where the request information includes "app ID" and "app password".

In the third embodiment, the information processing system 100 manages information similar to the information described in the first embodiment as illustrated in FIG. 8A to FIG. 8D.

Also, a configuration of the information processing system 100 of the third embodiment is similar to the configuration of the information processing system 100 of the second embodiment as illustrated in FIG. 15.

<Process Flow>

Figure 19:
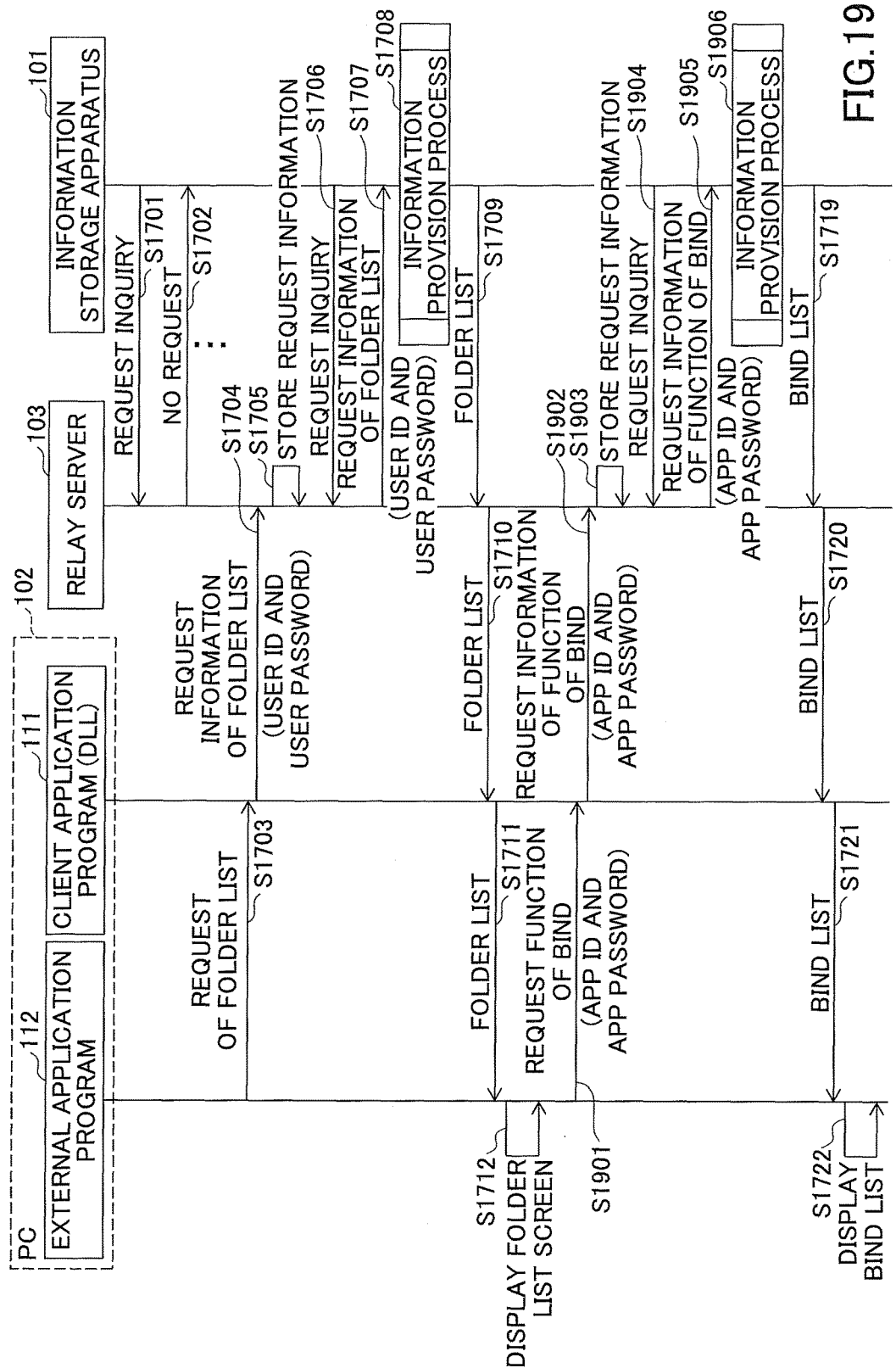
FIG. 19 is a sequence diagram illustrating an example process of the information processing system of a third embodiment.

FIG. 19 is a sequence diagram illustrating an example process of the information processing system of the third embodiment. Additionally, steps S1701-S1712 in FIG. 19 are similar to corresponding steps in FIG. 17 as described in the second embodiment. Therefore, here, difference between FIG. 17 and FIG. 19 is mainly described.

In step S1901, in response to the user's operation, etc., the external application program 112 of the PC 102 requests the function "bind" to the DLL401 provided by the client application program 111. The "app ID" and "app password" registered in the external application program 112 in advance are included in the request. Additionally, "app ID" is example identification information of the app.

In step S1902, the client application program 111 of the PC 102 transmits the request information of the function "bind" to the relay server 103. The "app ID" and "app password" registered in the external application program 112 in advance are included in the request information of the function "bind".

For example, the "app ID" and "app password" are set in the "Authorization" included in the access information item 1801 illustrated in FIG. 18A.

Alternatively, for example, the "app ID" may be set in the "applicationID" of the access information item 1802 illustrated in FIG. 18A. In the following, descriptions are given in a case where the "app ID" and "app password" are set in the "Authorization" included in the access information item 1801 illustrated in FIG. 18A and the request information is transmitted to the information storage apparatus 101.

In step S1903, the relay server 103 stores the request information received from the PC 102 in the storage unit.

In step S1904, for example, the information storage apparatus 101 transmits the request inquiry to the relay server 103 at every predetermined interval.

In step S1905, in response to the request inquiry from the information storage apparatus 101, the relay server 103 transmits the request information of the function "bind" stored in the storage unit to the information storage apparatus 101.

In step S1906, the information storage apparatus 101 performs the information provision process illustrated in FIG. 16.

Here, the request information transmitted from the PC 102 includes the authentication information ("app ID" and "app password") of the app managed by the app information management unit 314 instead of authentication information of the user managed by the authentication unit 312. In the present embodiment, the request information including the "app ID" and "app password" that are managed by the app information management unit 314 is successfully authenticated by the authentication unit 312 (YES in step S1102 of FIG. 16).

The identification information (app ID) of the app is included in the request information of the function "bind" transmitted from the PC 102 (YES in step S1103 of FIG. 16). Therefore, the information provision unit 313 of the information storage apparatus 101 performs a filtering process on the default folder list (step S1104 of FIG. 16).

Also, here, the app identification information (app ID) of the app included in the request information of the function "bind" is validated. In this case, the information provision unit 313 of the information storage apparatus 101 adds a folder dedicated for the external application program 112 corresponding to the identification information (app ID) of the app in the folder list on which the filtering process has been performed (step S1105 of FIG. 16). Further, the information provision unit 313 transmits the folder list in which the dedicated folder has been added to the PC 102 (step S1106 of FIG. 16).

As described above, according to the third embodiment, an advantageous effect similar to the advantageous effect of the second embodiment can be obtained, where the "app ID" and "app password" that are registered in the external application program 112 in advance are used instead of the app identification information used in the second embodiment.

As described above, various applications and variations of the information processing system 100 and the method may be provided.

<Summary>

The information processing system (100) of the present disclosure is an information processing system comprising a terminal apparatus (102) and an information processing apparatus (101) that is connected to the terminal apparatus via a network, the terminal apparatus including a storage unit (204) configured to store: a first application program (111) configured to provide another application program that is executed in the terminal apparatus with an interface (401) for transmitting request information to the information processing apparatus, wherein the first application program includes authentication information for using the information processing apparatus; and a second application program (112) configured to transmit the request information including identification information of application program to the information processing apparatus in response to a predetermined operation, where the identification information of application program is recorded in the second application program, the information processing apparatus including: an authentication unit (311) configured to authenticate the request information transmitted from the terminal apparatus; and an information provision unit (313) configured to change a folder structure information in response to detecting that the request information is successfully authenticated and the identification information of the application program is included in the request information, wherein a folder list is displayed in the terminal apparatus in accordance with the folder structure information.

Additionally, reference numerals indicated in parenthesis above are added only for convenience of understanding, and not a limiting example. Herein above, although the present disclosure has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising a terminal apparatus and an information processing apparatus that is connected to the terminal apparatus via a network, the terminal apparatus including a storage unit configured to store:
  a first application program configured to provide another application program that is executed in the terminal apparatus with an interface for transmitting request information to the information processing apparatus, wherein the first application program includes authentication information for using the information processing apparatus; and
  a second application program configured to transmit the request information including identification information of an application program to the information processing apparatus in response to a predetermined user's operation, wherein the identification information of the application program is recorded in the second application program, the information processing apparatus including:
  an authentication unit configured to authenticate the request information transmitted from the terminal apparatus; and
  an information provision unit configured to change folder structure information in response to detecting that the request information is successfully authenticated and the identification information of the application program is included in the request information, wherein a folder list is displayed in the terminal apparatus in accordance with the folder structure information, wherein the second application program transmits the request information including the identification information of the application program according to a file sharing protocol other than a protocol used for transmitting the request information from the first application program to the information processing apparatus.

2. The information processing system according to claim 1, wherein the information provision unit deletes a predetermined information item in the folder structure information in response to detecting that the request information is successfully authenticated and the identification information of the application program is included in the request information.

3. The information processing system according to claim 1, wherein the information provision unit adds a folder dedicated for the second application program in the folder structure information in response to detecting that the request information is successfully authenticated and the identification information of the application program included in the request information is validated.

4. The information processing system according to claim 1, wherein the information processing apparatus further includes a management unit configured to manage a validity of the identification information of the application program recorded in the second application program, and the management unit verifies activation code for activating the second application program, and wherein the identification information of the application program recorded in the second application program is validated in response to the activation code being successfully verified.

5. The information processing system according to claim 1, wherein the second application program transmits the request information that does not include the identification information of the application program to the information processing apparatus by using an interface for transmitting the request information to the information processing apparatus, the interface being provided by the first application program.

6. The information processing system according to claim 1, wherein the second application program transmits the request information that includes the identification information of the application program to the information processing apparatus by using an interface for transmitting the request information to the information processing apparatus, the interface being provided by the first application program.

7. An information processing apparatus connected to a terminal apparatus via a network, the terminal apparatus including a storage unit configured to store a first application program configured to provide another application program that is executed in the terminal apparatus with an interface for transmitting request information to the information processing apparatus, wherein the first application program includes authentication information for using the information processing apparatus; and a second application program configured to transmit the request information including identification information of an application program to the information processing apparatus in response to a predetermined user's operation, wherein the identification information of the application program is recorded in the second application program, the information processing apparatus comprising:

an authentication unit configured to authenticate the request information transmitted from the terminal apparatus; and an information provision unit configured to change folder structure information in response to detecting that the request information is successfully authenticated and the identification information of the application program is included in the request information, wherein a folder list is displayed in the terminal apparatus in accordance with the folder structure information, wherein the second application program transmits the request information including the identification information of the application program according to a file sharing protocol other than a protocol used for transmitting the request information from the first application program to the information processing apparatus.

8. A method of an information processing apparatus connected to a terminal apparatus via a network, the terminal apparatus including a storage unit configured to store a first application program configured to provide another application program that is executed in the terminal apparatus with an interface for transmitting request information to the information processing apparatus, wherein the first application program includes authentication information for using the information processing apparatus; and a second application program configured to transmit the request information including identification information of an application program to the information processing apparatus in response to a predetermined user's operation, wherein the identification information of the application program is recorded in the second application program, the method comprising:

authenticating the request information transmitted from the terminal apparatus; and changing folder structure information in response to detecting that the request information is successfully authenticated and the identification information of the application program is included in the request information, wherein a folder list is displayed in the terminal apparatus in accordance with the folder structure information, wherein the second application program transmits the request information including the identification information of the application program according to a file sharing protocol other than a protocol used for transmitting the request information from the first application program to the information processing apparatus.

* * * * *